United States Patent [19]
Shiomi

[11] Patent Number: 6,088,533
[45] Date of Patent: *Jul. 11, 2000

[54] TRANSMISSION APPARATUS FOR IMAGE BLUR PREVENTION

[75] Inventor: Yasuhiko Shiomi, Kawaguchi, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/870,272

[22] Filed: Jun. 6, 1997

Related U.S. Application Data

[63] Continuation of application No. 08/361,953, Dec. 22, 1994, abandoned.

[30] Foreign Application Priority Data

Dec. 27, 1993  [JP]  Japan ...................................... 5-331097

[51] Int. Cl.[7] .................................................... G03B 17/00
[52] U.S. Cl. ................................................ 396/52; 395/55
[58] Field of Search ................................... 354/286, 430, 354/446, 400, 406; 348/208; 250/231.1; 396/52, 53, 54, 55, 532; 359/554

[56] References Cited

U.S. PATENT DOCUMENTS

| | | |
|---|---|---|
| 5,020,369 | 6/1991 | Washisu et al. ........................... 73/517 |
| 5,117,246 | 5/1992 | Takahashi et al. ...................... 354/202 |
| 5,175,580 | 12/1992 | Shiomi .................................... 354/410 |
| 5,210,563 | 5/1993 | Hamada et al. ........................ 354/400 |
| 5,229,603 | 7/1993 | Shiomi ................................. 250/231.1 |
| 5,231,445 | 7/1993 | Onuki et al. ............................ 354/410 |
| 5,309,250 | 5/1994 | Giacometti .............................. 358/406 |
| 5,416,554 | 5/1995 | Hamada et al. ........................ 354/400 |
| 5,416,558 | 5/1995 | Katayama et al. ...................... 354/446 |
| 5,444,512 | 8/1995 | Morizumi ................................ 354/430 |
| 5,713,049 | 1/1998 | Ohishi et al. ............................. 396/55 |
| 5,771,403 | 6/1998 | Imada ....................................... 396/52 |
| 5,870,634 | 2/1999 | Sugaya et al. ............................ 396/52 |

FOREIGN PATENT DOCUMENTS 3-248136  11/1991  Japan .

OTHER PUBLICATIONS

Digital Design Principles and Practices by John F. Wakerly, Prentice–Hall, Inc. pp. 44, 224, 236–237, 242 269, and 660, 1990.

*Primary Examiner*—Safet Metjahic
*Assistant Examiner*—Christopher E. Mahoney
*Attorney, Agent, or Firm*—Fitzpatrick, Cella, Harper & Scinto

[57] ABSTRACT

A transmission apparatus used in an image blur prevention system includes a communication portion for transmitting a first signal for preventing an image blur in a first direction (yaw) between first and second devices having independent arrangements, a communication portion also transmits a second signal for preventing an image blur in a second direction (pitch).

45 Claims, 24 Drawing Sheets

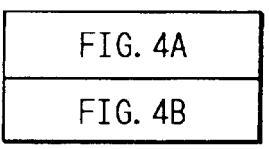
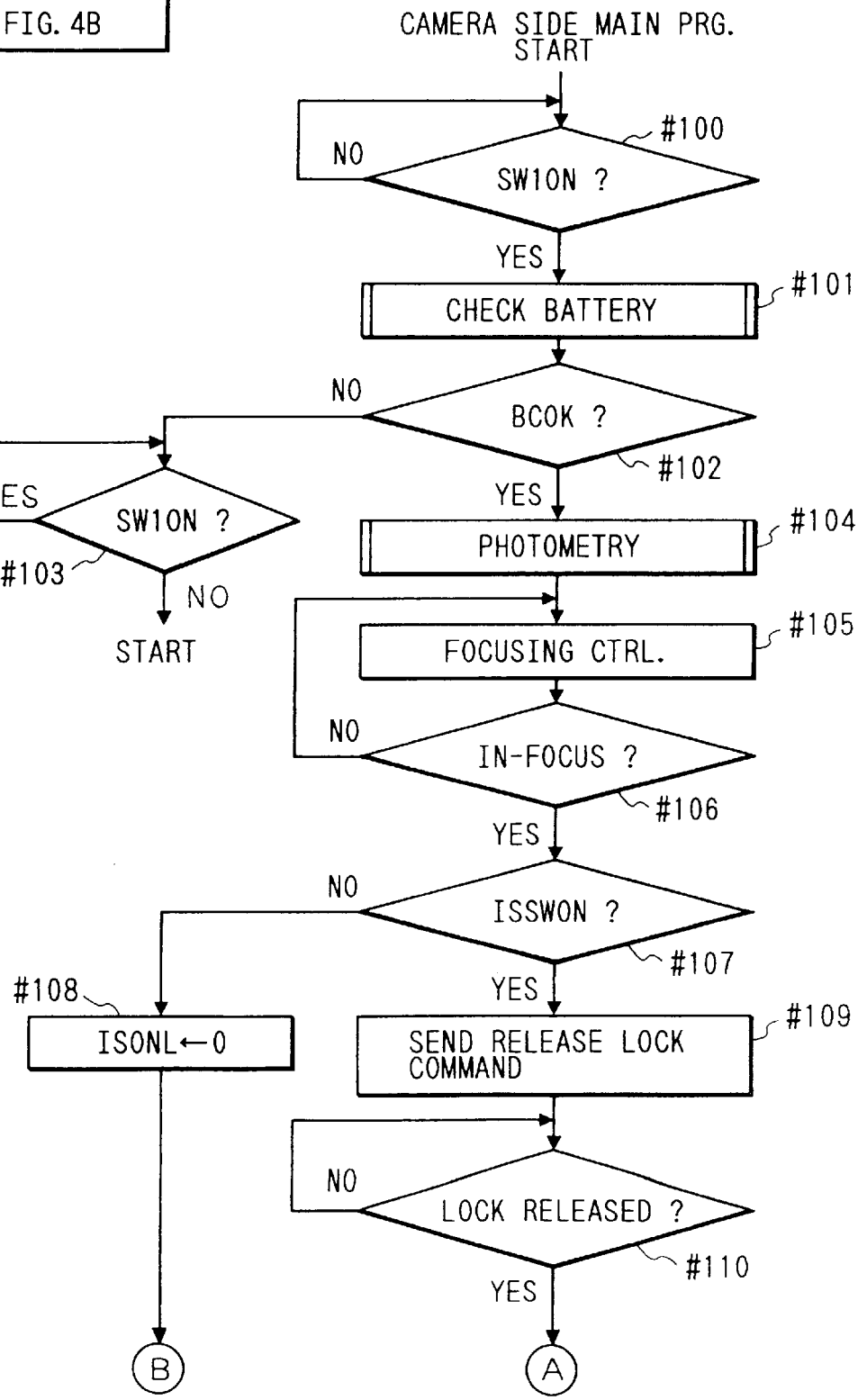

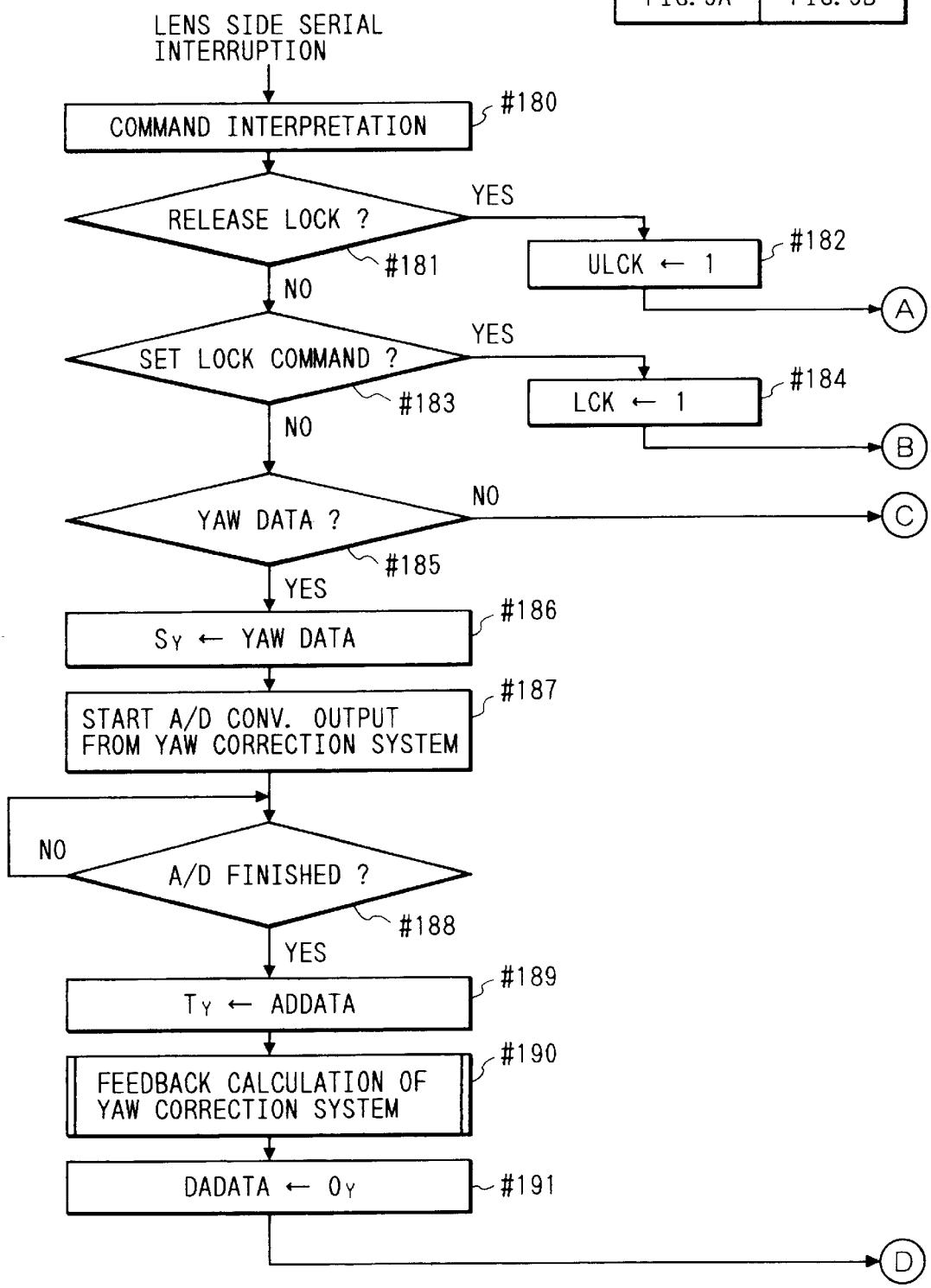

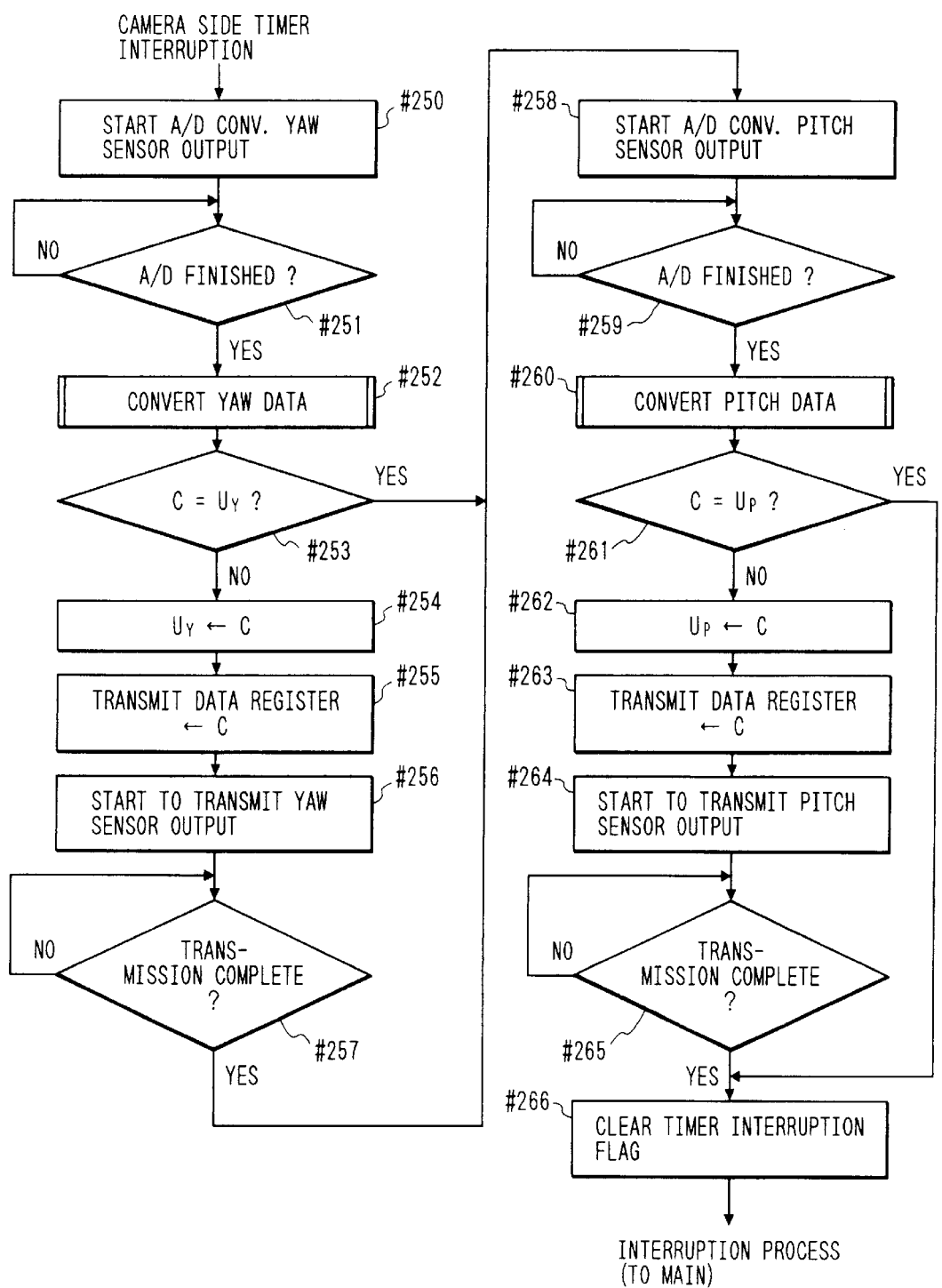

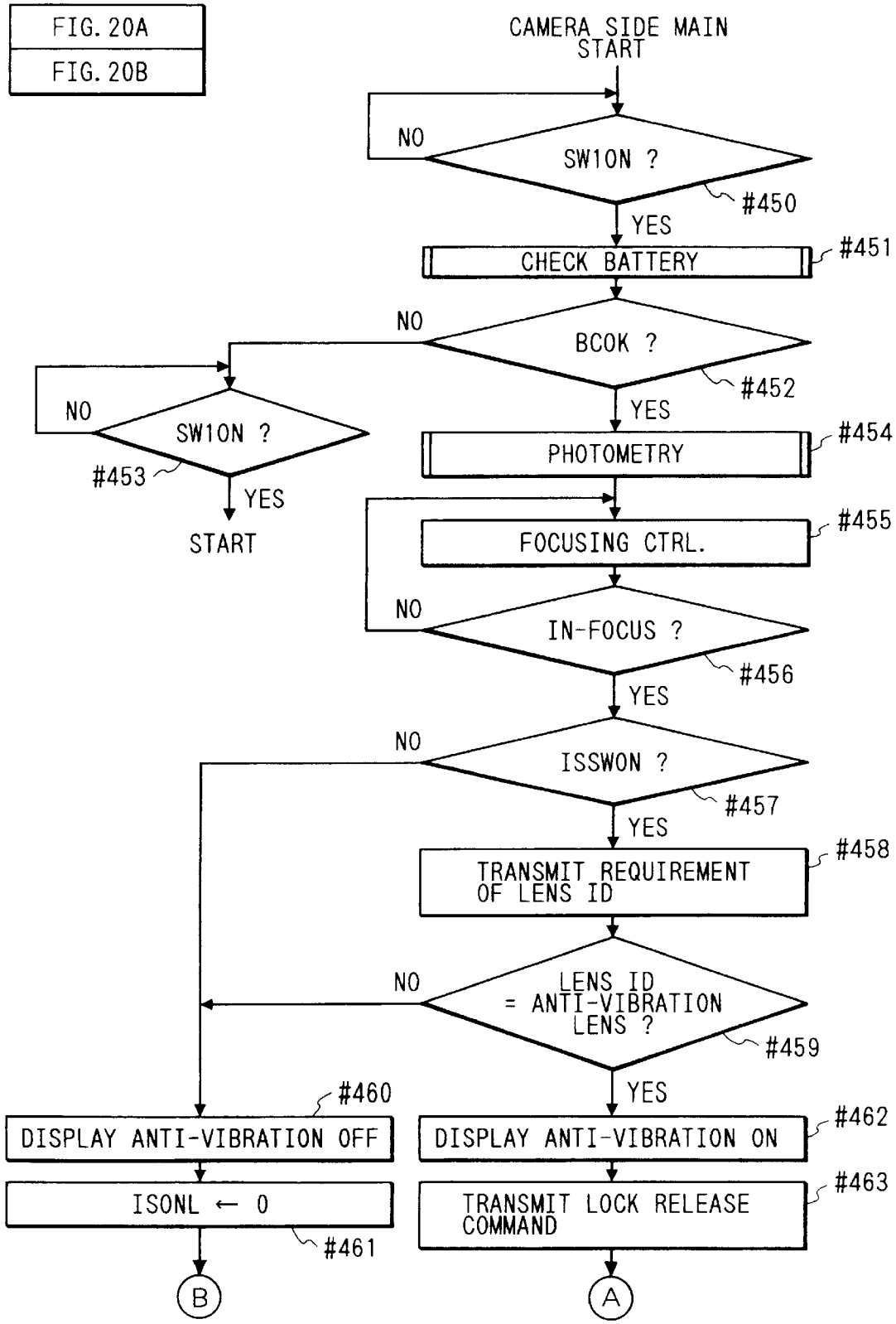

TRANSMISSION APPARATUS FOR IMAGE BLUR PREVENTION

This application is a continuation of application Ser. No. 08/361,953 filed Dec. 22, 1994, now abandoned.

BACKGROUND OF THE INVENTION

1. Field of the Invention

The present invention relates to a transmission apparatus for image blur prevention, which is used in an image blur prevention apparatus for preventing an image blur generated due to, e.g., a camera shake.

2. Related Background Art

FIG. 23 illustrates a conventional anti-vibration apparatus in which vibration sensors 4 and 5 for detecting the camera shake amount of a photographer are incorporated in an exchangeable lens 8, and a correction optical system 9 which is arranged in front of a photographing optical system 10 or uses some lenses in the optical system 10 is driven on the basis of the outputs from these sensors.

On the other hand, Japanese Laid-Open Patent Application No. 3-248136 discloses an image blur prevention system in which a camera has vibration sensors, an exchangeable lens has an image blur correction optical system, and blurred images in the yaw and pitch directions are transferred from the camera to the exchangeable lens via two different data signal lines.

However, in the above-mentioned prior art, two signal lines must be arranged between the camera and the lens to achieve one function, i.e., the image blur prevention function.

When a normal exchangeable lens having no image blur correction optical system is attached to a camera having vibration sensors, if the camera has no means for discriminating this state, an image blur detection signal is wastefully transferred to the exchangeable lens.

U.S. Pat. No. 5,483,376 discloses a technique for time-divisionally performing image blur prevention operations in two directions by a single control means.

SUMMARY OF THE INVENTION

One aspect of the invention is a transmission apparatus used in an image blur prevention system, which apparatus has a communication portion for transmitting a first signal for preventing an image blur in the first direction between first and second devices having independent arrangements, the communication portion also transmitting a second signal for preventing an image blur in the second direction.

With this arrangement, transmission of signals for image blur prevention between the independent devices can be performed by efficiently using the communication portion.

Another aspect of the invention is a transmission apparatus used in an image blur prevention apparatus, which apparatus has a transmission portion for transmitting a first signal associated with image blur prevention, the transmission portion also transmitting a second signal for a function different from the image blur prevention.

With this arrangement, both transmission of the signal associated with the image blur prevention and transmission of a signal for a function different from the image blur prevention can be attained without increasing the number of communication portions.

BRIEF DESCRIPTION OF THE DRAWINGS

FIG. 11 is a flow chart showing the operation of a camera system according to the second embodiment of the present invention;

DETAILED DESCRIPTION OF THE PREFERRED EMBODIMENT (First Embodiment)

Figure 1:
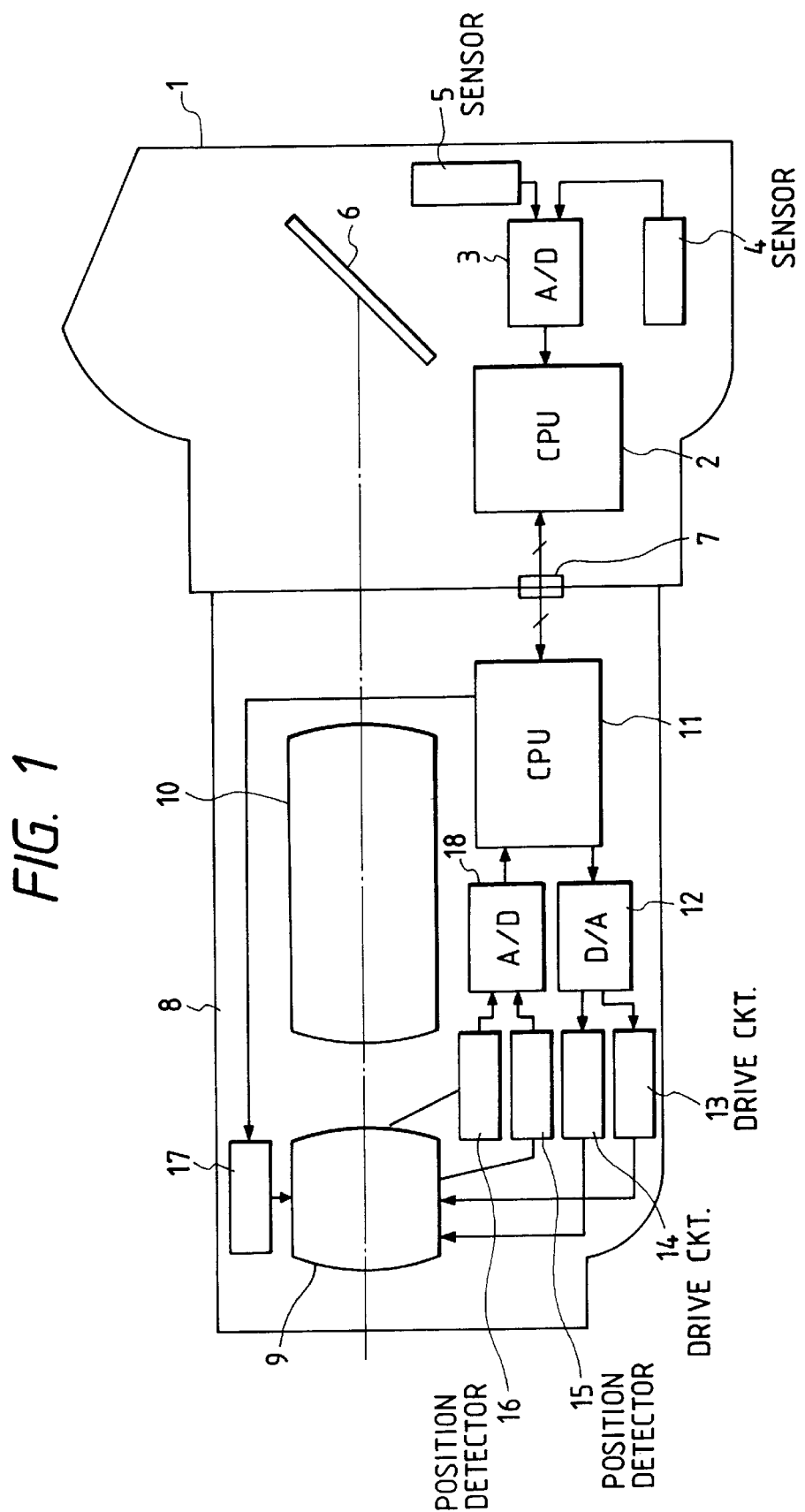
FIG. 1 is a sectional view showing the arrangement of a camera system according to the first embodiment of the present invention.
Figure 2:
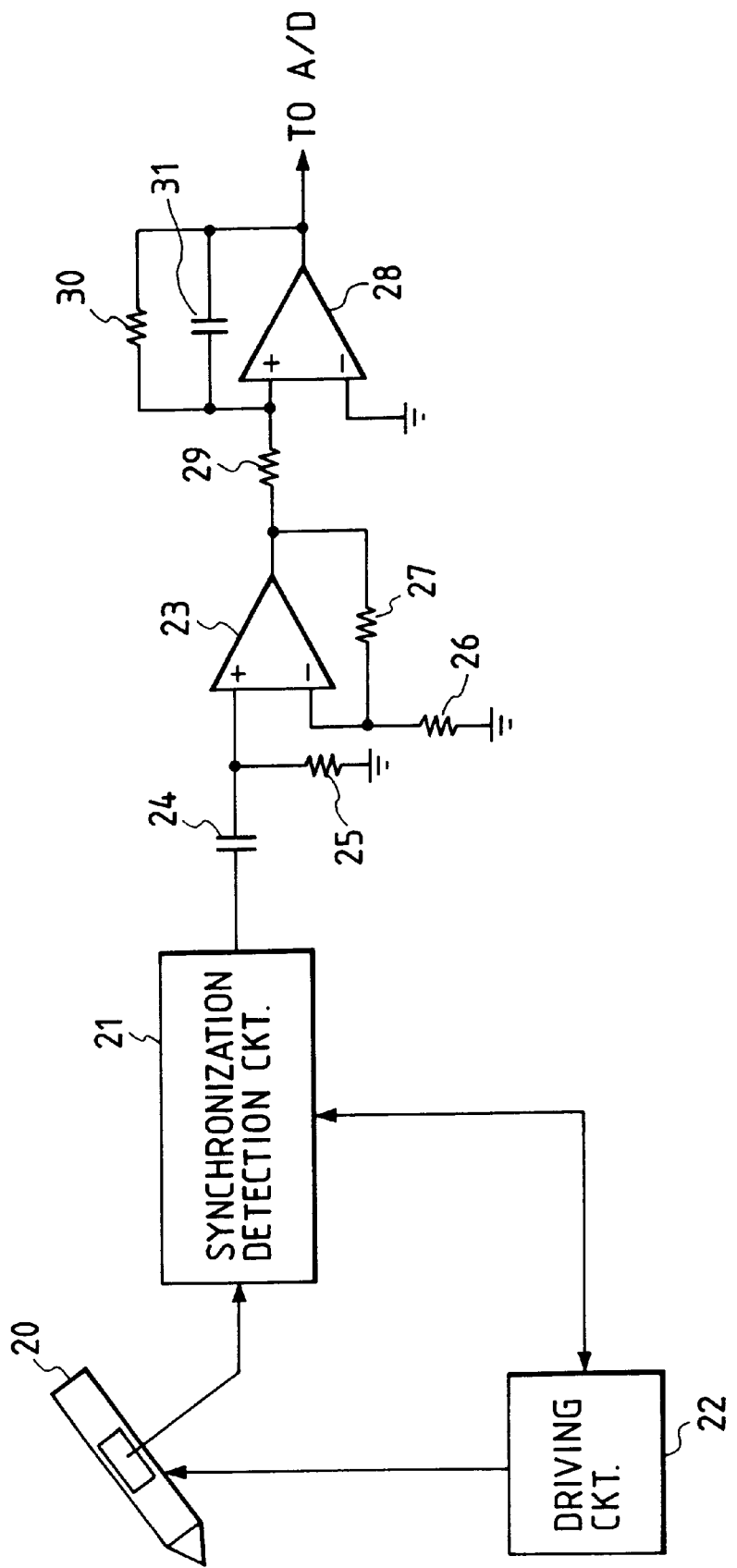
FIG. 2 is a diagram showing the arrangement of an angular acceleration sensor in the camera system according to the first embodiment of the present invention.

FIG. 1 is a sectional view showing the arrangements of a camera main body and a lens as a whole according to the first embodiment of the present invention. A camera main body 1 includes a CPU 2 for controlling the entire system, and sensors 4 and 5 for detecting vibrations in the yaw and pitch directions of the entire camera are arranged in the camera, as shown in FIG. 1. The outputs from these sensors are converted into digital data by an A/D converter 3, and the digital data are fetched as internal data of the CPU 2. The internal arrangement of each of the sensors 4 and 5 comprises a vibration gyro as an angular velocity sensor and an integrator circuit, as shown in FIG. 2. Referring to FIG. 2, a vibration gyro 20 is resonated by a driving circuit 22, and the output from the vibration gyro 20 is converted by a synchronization detection circuit and the like to obtain a predetermined angular velocity output. The output from the synchronization detection circuit normally includes an unnecessary DC offset component, and this DC component is removed by a high-pass filter constituted by a capacitor 24 and a resistor 25. Only the remaining vibration signal is amplified by an amplifier constituted by an OP amplifier 23 and resistors 26 and 27. Furthermore, the output from this amplifier is integrated by an integration circuit constituted by an OP amplifier 28, resistors 29 and 30, and a capacitor 31 to be converted into an output proportional to a vibration displacement of the camera. The integrated output is connected to the A/D converter 3, as described above.

Referring back to FIG. 1, the sensor data fetched in the CPU 2 are transferred to a CPU 11 in an exchangeable lens 8 via a normal serial bus line 7 which is used for exchanging information for focusing control, aperture control, and the like between the camera main body 1 and the exchangeable lens 8. In the exchangeable lens 8, the outputs from position detectors 15 and 16 for detecting the absolute position of a correction optical system 9 itself are converted into digital data by an A/D converter 18, and the digital data are fetched in the CPU 11. Furthermore, the CPU 11 compares the sensor data from the camera main body with the position data of the correction optical system 9, and transfers the comparison result to a D/A converter 12. The output result from the D/A converter is finally input to drive circuits 13 and 14, and the correction optical system 9 is driven by electric power supplied from these drive circuits.

Figure 3:
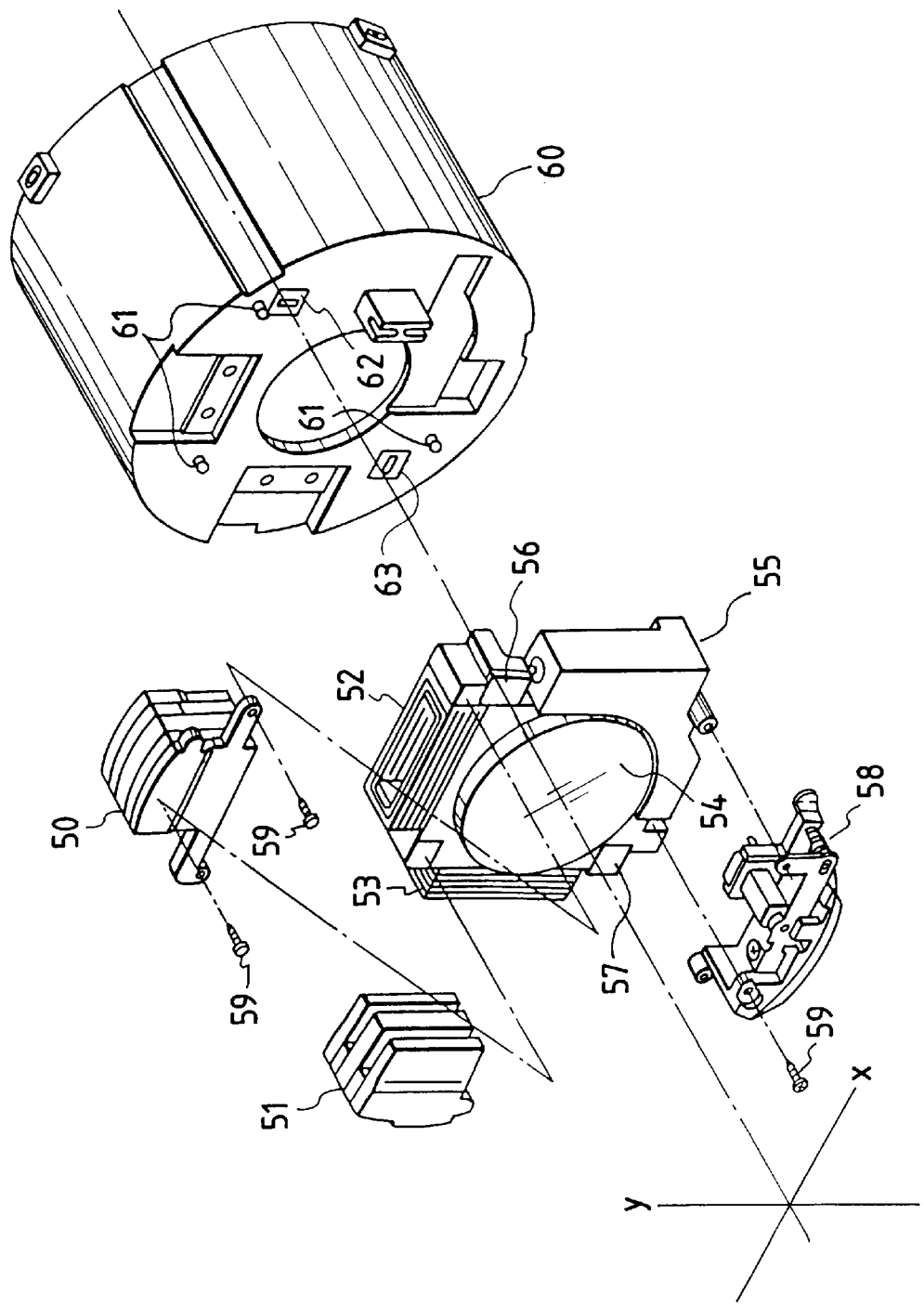
FIG. 3 is a perspective view showing the arrangement of a correction optical system in the camera system according to the first embodiment of the present invention.

FIG. 3 shows the detailed arrangement of the correction optical system 9. FIG. 3 illustrates the arrangement of a so-called shift optical system which corrects an image blur caused by an angular displacement of the camera by translating lenses in the x and y directions perpendicular to the optical axis z. Yoke portions 50 and 51 (magnetic circuit units) serve as actual drive sources in the x- and y-axis directions, and coil portions 52 and 53 respectively correspond to the yoke portions 50 and 51. When these coil portions receive currents from the above-mentioned drive circuits 13 and 14, a lens group 54 as a portion of a photographing lens is decentered in the x and y directions. The lens group 54 is fixed by a support arm & support frame 55. On the other hand, the movement of the lens group 54 is detected in a non-contact manner by combinations of IREDs 56 and 57 which move together with the lens, and PSDs 62 and 63 attached to a lens barrel portion 60 for holding the entire shift lens. A mechanical lock mechanism 58 mechanically holds the lens group at substantially the central position of the optical axis when energization to the shift system is stopped. Charge pins 59 are attached to the yoke portion 50, and a support ball 61 serves as an anti-tilt member, which regulates the tilt direction of the shift system.

Figure 6:
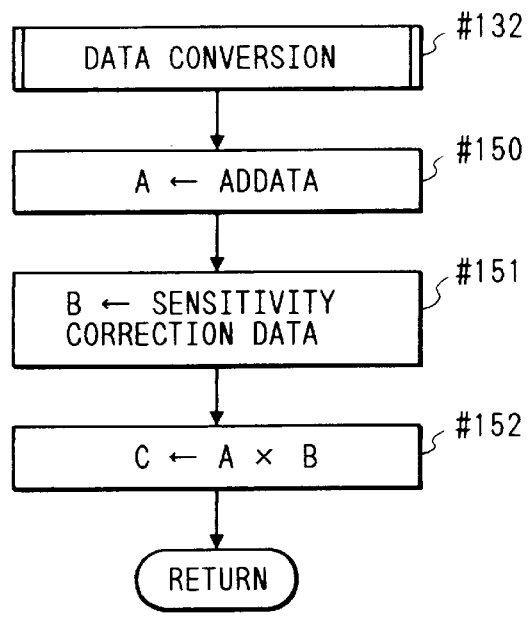
FIG. 6 is a flow chart showing the operation of the camera system according to the first embodiment of the present invention.
Figure 7:
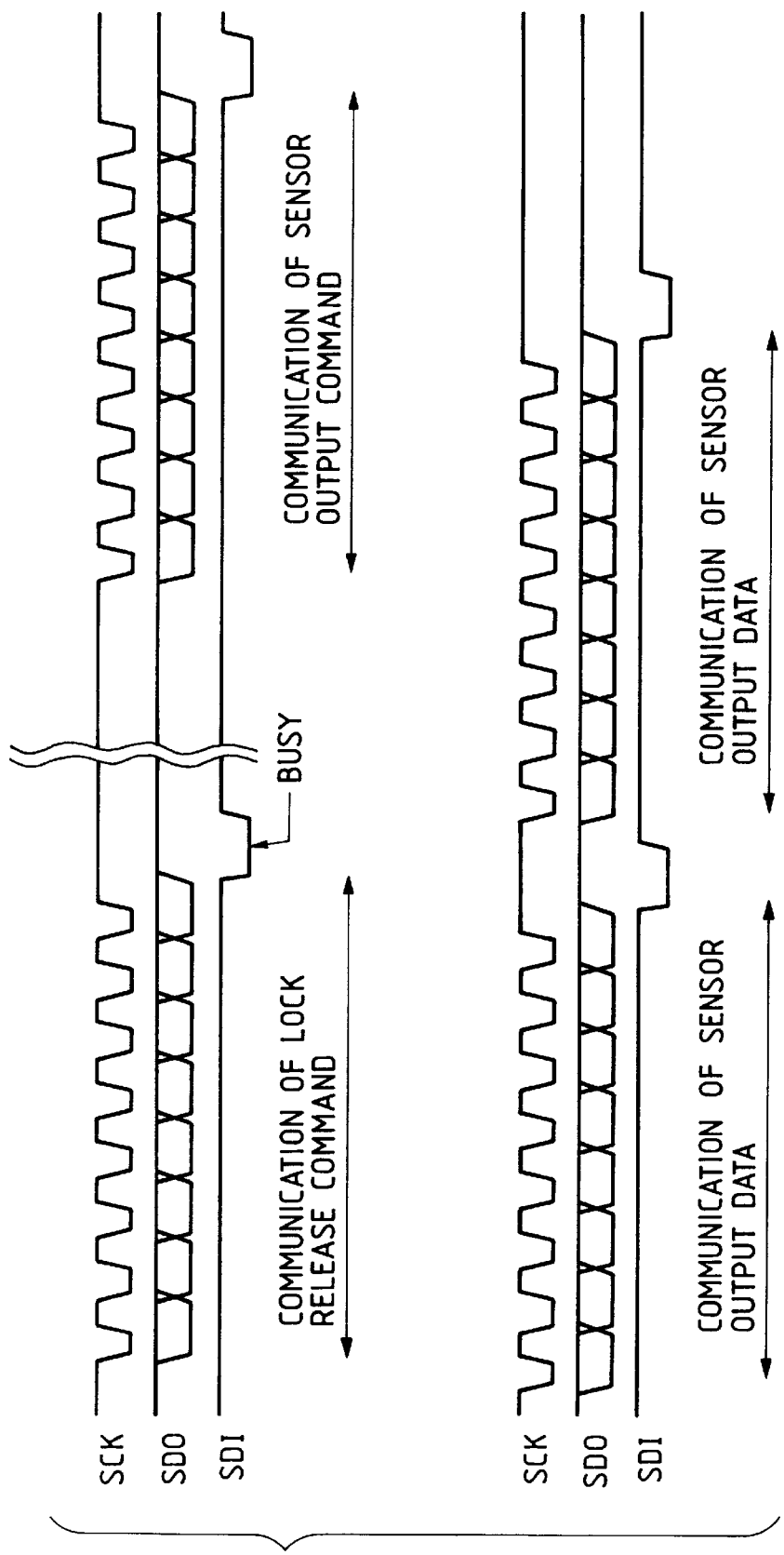
FIG. 7 is a timing chart showing the operation of the camera system according to the first embodiment of the present invention.

The detailed control method of this embodiment will be described below with reference to the flow charts shown in FIGS. 4A, 4B, 5, 6, 8, 9A, 9B and 10, the timing chart shown in FIG. 7, and the like.

Figure 4B:
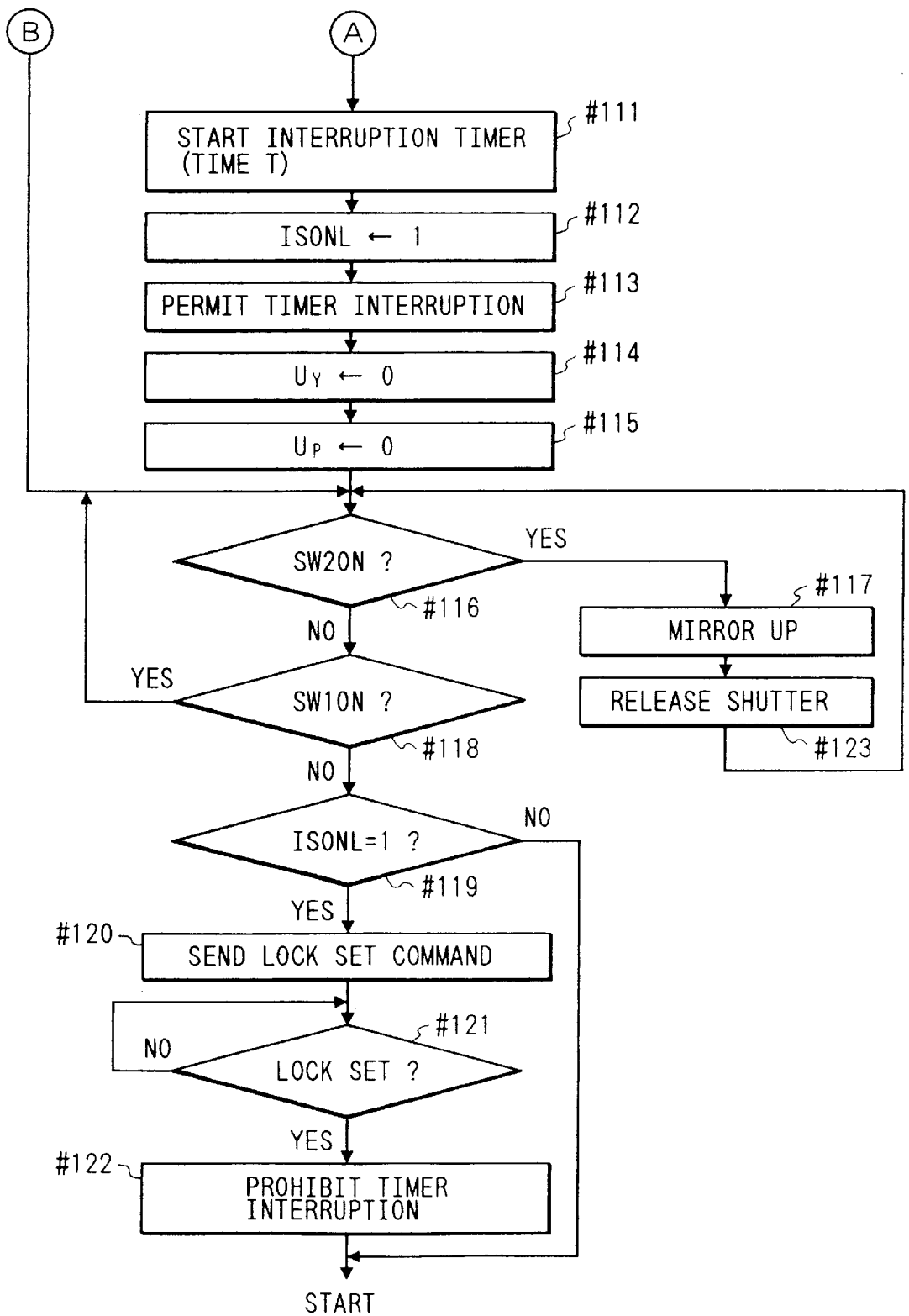
FIG. 4 is comprised of FIGS. 4A and 4B, which are flow charts showing the operation of the camera system according to the first embodiment of the present invention.

FIGS. 4A and 4B show the main flow of control of the camera operation associated with an anti-vibration operation. Referring to FIG. 4A, in step #100, it is checked if an SW1 (not shown) of the camera is turned on upon a release start operation of the camera main body. If Y (YES) in step #100, a battery check circuit (not shown) discriminates in steps #101 and #102 whether or not a power supply voltage is sufficient to guarantee the operation of the entire camera. If N (NO) in step #102, the flow advances to step #103, and the control waits until the SW1 is turned off. When N in step #103, the flow returns to the START position. On the other hand, if Y in step #102, a normal photometry operation is performed by a photometry sensor (not shown) in the camera main body 1 in step #104, actual focusing control is executed in step #105 in such a manner that a signal corresponding to the detection output from an optical sensor (not shown) in the camera main body 1 is transmitted to the exchangeable lens 8 via the serial bus line 7, and the CPU 11 drives a focusing lens (not shown) in a photographing optical system 10 of the exchangeable lens 8 in correspondence with the signal. This focusing control is continued until an in-focus state is detected in step #106. When an in-focus state is detected, it is checked in step #107 if an ISSW (not shown) is ON. If N in step #107, it is determined that an anti-vibration operation is not required, and the flow advances to step #108 to reset a latch ISONL in the CPU to "0". Thereafter, the flow jumps to step #116. However, if Y in step #107, it is determined that an anti-vibration photographing operation is selected, and a lock release command is sent from the CPU 2 to the CPU 11 via the serial bus line 7 in step #109. FIG. 7 is a timing chart showing the command communication state in this case. In FIG. 7, SCK represents synchronization clocks for a serial communication, SDO represents serial data transferred from the camera main body to the lens side, and SDI represents serial data transferred from the lens side to the camera main body at the same time. As shown in FIG. 7, when a mechanical lock release command of at least 1 byte is transmitted from the camera main body to the lens, a BUSY signal indicating that data has been received is detected from the serial data SDI. Upon detection of this signal, the CPU 2 determines in step #110 that the mechanical lock release operation has ended (although the end of the mechanical lock release operation is slightly delayed in practice, the end of the release operation is determined by the end of reception of the command in a sequence). In step #111, a timer for generating an interruption each predetermined period T starts a time-measuring operation via an initial operation. The latch ISONL indicating an anti-vibration operation state in the CPU is set to be "1" in step #112, and an interruption operation of the timer is permitted in step #113. In steps #114 and #115, calculation registers $U_Y$ and $U_P$ (to be described later) are respectively initialized to "0", and it is then checked in step #116 if an SW2 (not shown) of the camera is turned on upon an actual shutter release operation. If Y in step #116, it is determined that a photographer has actually started a release operation, and an up operation of a mirror 6 in the camera main body shown in FIG. 1 is executed in step #117.

In step #123, a signal corresponding to photometry data obtained in step #104 described above is transmitted to the CPU 11 in the exchangeable lens 8 via the serial bus line 7, so that the CPU 11 controls the aperture state of an aperture mechanism (not shown) in the exchangeable lens, and a shutter mechanism (not shown) in the camera main body performs a shutter release operation.

Note that the photometry data may be transmitted at another timing, e.g., a timing immediately before the mirror-up operation executed in step #117.

On the other hand, if N in step #116, it is determined that the photographer is still performing a framing operation (determining a photographing frame), and the flow advances to step #118. If it is determined in step #118 that the SW1 is still ON, the flow returns to step #116 to repeat the above-mentioned operations. However, if it is determined in step #118 that the SW1 is OFF, the CPU 2 determines that the photographer has ended a photographing operation of the camera, and the flow advances to step #119 to check the contents of the above-mentioned latch ISONL. If it is determined in step #119 that ISONL="0", it is determined that an anti-vibration operation is not executed, and the flow immediately returns to step #100. However, if ISONL="1" in step #119, it is determined that an anti-vibration operation is executed, and the flow advances to step #120 to transmit a lock set command. The lock set command is transmitted from the CPU 2 to the CPU 11 as in the timing chart in FIG. 7 in the same manner as the above-mentioned lock release command (of course, its data contents are different). Finally, it is checked in step #121 if the lock set operation is completed. If completion of the lock set operation is detected, the above-mentioned timer interruption operation is prohibited in step #122, and a series of operation end.

Figure 5:
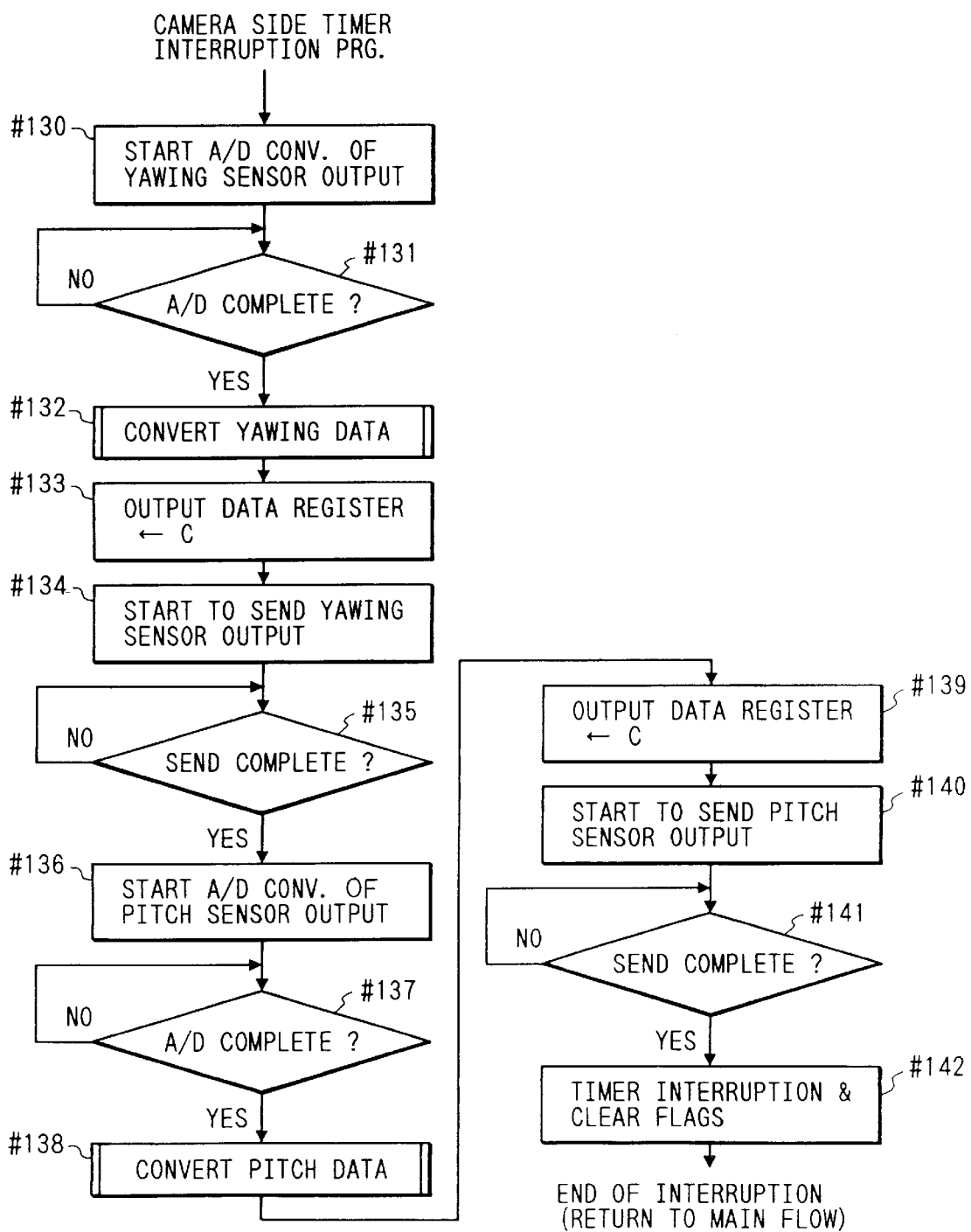
FIG. 5 is a flow chart showing the operation of the camera system according to the first embodiment of the present invention.

FIG. 5 is a flow chart showing control of the interruption processing operation generated each predetermined period T described above. The interruption processing operation will be described below with reference to FIG. 5. In step #130, the output from the vibration detection sensor 5 for the yaw direction shown in FIG. 1 begins to be converted into digital data by the A/D converter 3. If the end of conversion is detected in step #131, a predetermined calculation is performed for the conversion result in step #132. In this case, in the data conversion operation, a data conversion subroutine shown in FIG. 6 is used. In the operation of the data conversion subroutine, the contents of an ADDATA register which stores the A/D conversion result are transferred to a versatile calculation register A in the CPU 2 in step #150. In step #151, data for correcting the sensitivity of each sensor is similarly transferred to a versatile calculation register B. Finally, in step #152, the contents of the two versatile calculation registers are multiplied with each other, and the product is set in a register C. In step #133, the calculation result is transferred to a transmission data register. In step #134, an actual transmission operation via the serial bus line 7 is started. In an actual sensor output method, as shown in the timing chart in FIG. 7, a command indicating a sensor output is transmitted (of course, this command includes a flag for identifying the yaw or pitch direction, and the like), and the contents of the register C corresponding to the sensor output are transferred as serial data of at least 1 byte. If the end of transfer of the sensor data is detected in step #135, the A/D conversion operation for the sensor output in the pitch direction, in turn, is started in step #136. Since the processing for the sensor output in the pitch direction in steps #136 to #141 is the same as that in steps #130 to #135 in the yaw direction, a detailed description thereof will be omitted. Finally, a timer interruption flag is cleared to "0" in step #142, and the interruption processing operation ends. Then, the flow returns to the main flow shown in FIGS. 4A and 4B. In this manner, in the processing of the CPU 2, an interruption is generated each predetermined period T, and the outputs from the yaw and pitch sensors arranged in the camera main body are transmitted to the lens in each interruption.

Figure 8:
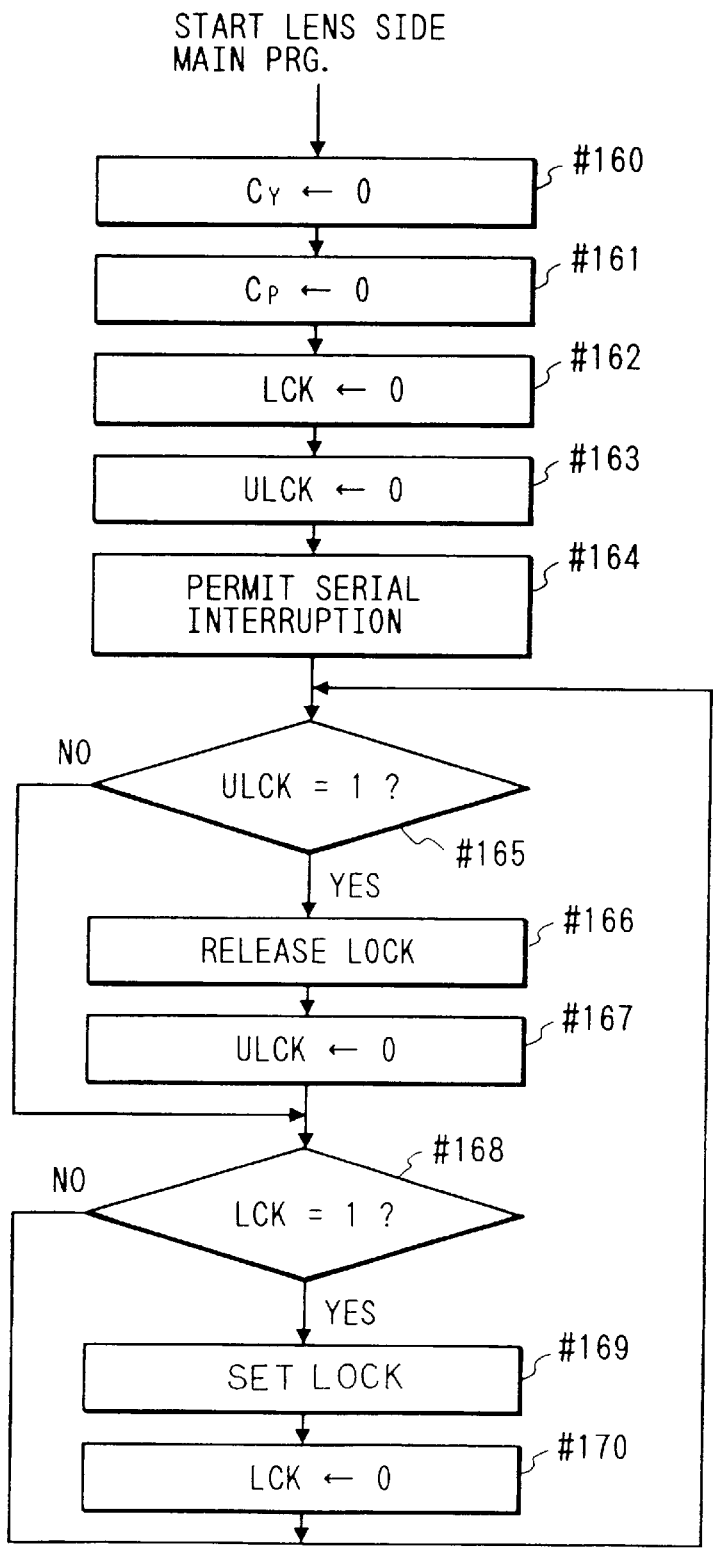
FIG. 8 is a flow chart showing the operation of the camera system according to the first embodiment of the present invention.
Figure 9B:
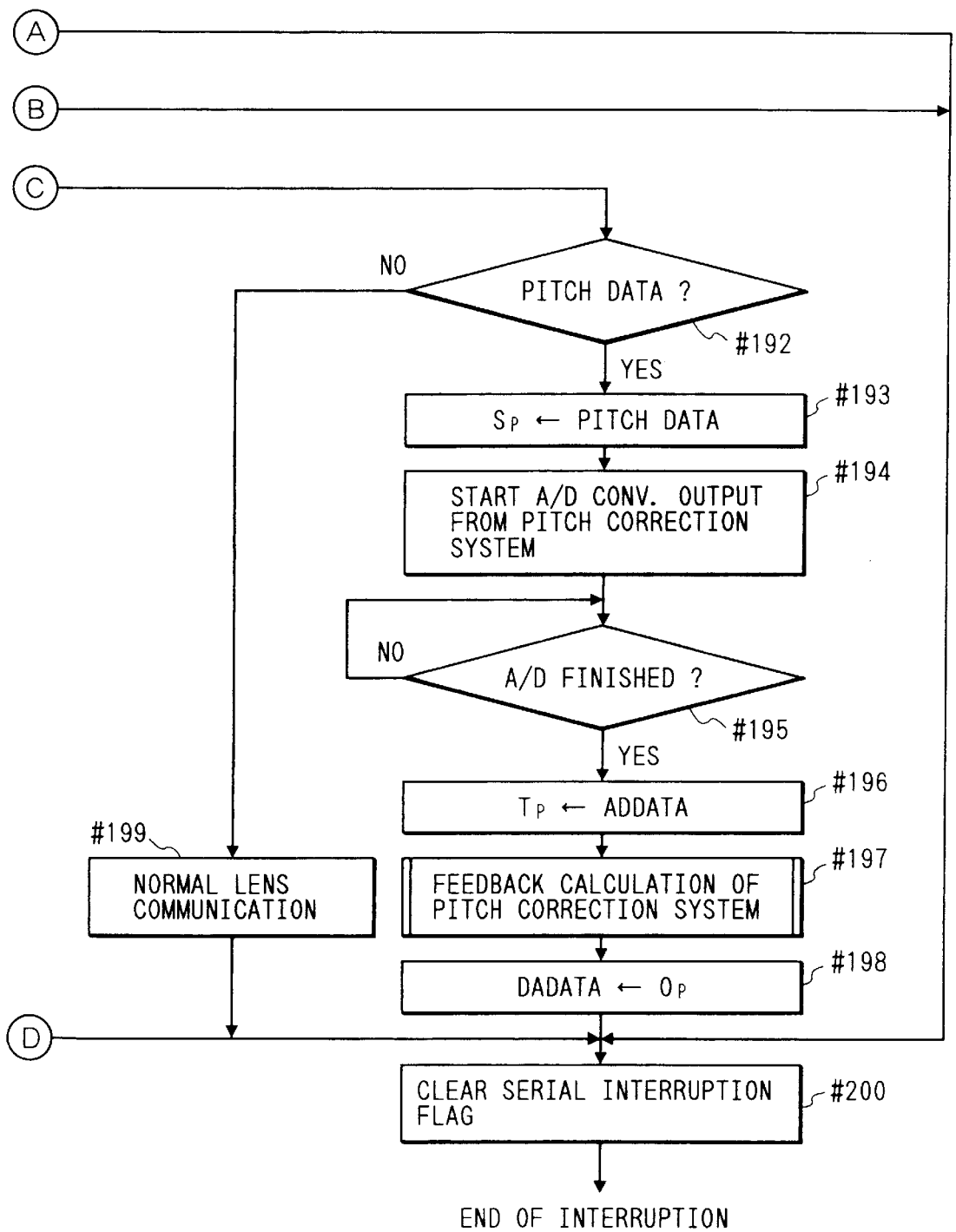
FIG. 9 is comprised of FIGS. 9A and 9B, which are flow charts showing the operation of the camera system according to the first embodiment of the present invention.

The control method at the lens side will be explained below with reference to the flow charts in FIGS. 8, 9A and 9B. FIG. 8 is a flow chart showing the main flow of the CPU 11 in the lens. In steps #160 and #161, correction calculation internal registers $C_Y$ and $C_P$ for lens control are respectively reset to "0". A flag LCK indicating lock set control is reset to "0" in step #162, and a flag ULCK indicating lock release control is similarly reset to "0" in step #163. In step #164, an interruption operation of a serial interface for receiving data transmitted from the camera main body is permitted. In step #165, it is checked if a lock release command is received in the serial interface communication interruption processing to be described later. When the flag ULCK is reset to "0", it is determined that a lock release command is not received, and the flow advances to step #168. However, when the flag ULCK is set to "1", it is determined that a lock release command is received, and a lock release operation is performed immediately in step #166. In this case, a current in a predetermined direction is supplied to a plunger in the mechanical lock mechanism 58 shown in FIG. 3 via a mechanical lock driver (not shown) in accordance with a control signal from the CPU 11, and the shift lens group 54 is unlocked. Furthermore, in step #167, the above-mentioned flag ULCK is reset to "0". On the other hand, it is checked in step #168 if the flag LCK indicating lock set control is set to be "1". If the flag LCK is reset to "0", it is determined that a lock set command is not received, and the flow returns to step #165. However, if the flag LCK is set to be "1", it is determined that a lock set command is received, and a lock set operation is performed immediately in step #169. In this case as well, as in the above-mentioned lock release operation, a current in a direction opposite to that in the lock release operation is supplied to the plunger in the mechanical lock mechanism, and the movement of the shift lens group 54 is forcibly stopped by a lever. Finally, in step #170, the flag LCK is reset to "0", and the flow returns to step #165, thus repeating the above-mentioned operations.

The serial communication processing method at the lens side shown in FIGS. 9A and 9B will be explained below. In step #180, a command as communication contents sent from the camera side is interpreted, and it is checked in step #181 if the communication contents correspond to a lock release command. If Y in step #181, the flag ULCK for urging the lock release operation in the CPU is set to be "1", and the flow jumps to step #200 to clear a flag for a serial interruption, thus ending this interruption operation. Therefore, in this case, the lock release operation is executed in the main flow operation shown in FIG. 8, as described above. On the other hand, if N in step #181, it is checked in step #183 if the communication contents correspond to a lock set command. If Y in step #183, the flag LCK for urging the lock set operation in the CPU is set to be "1", and the flow jumps to step #200 as in reception of the lock release command, thus ending the interruption operation. However, if N in step #183, it is checked in step #185 if the communication contents correspond to sensor data in the yaw direction. If it is determined that the received command coincides with a reception command of yaw sensor data, the contents of serial data in the format shown in the timing chart in FIG. 7 are set in a register $S_Y$ in the CPU 11 in step

Figure 10:
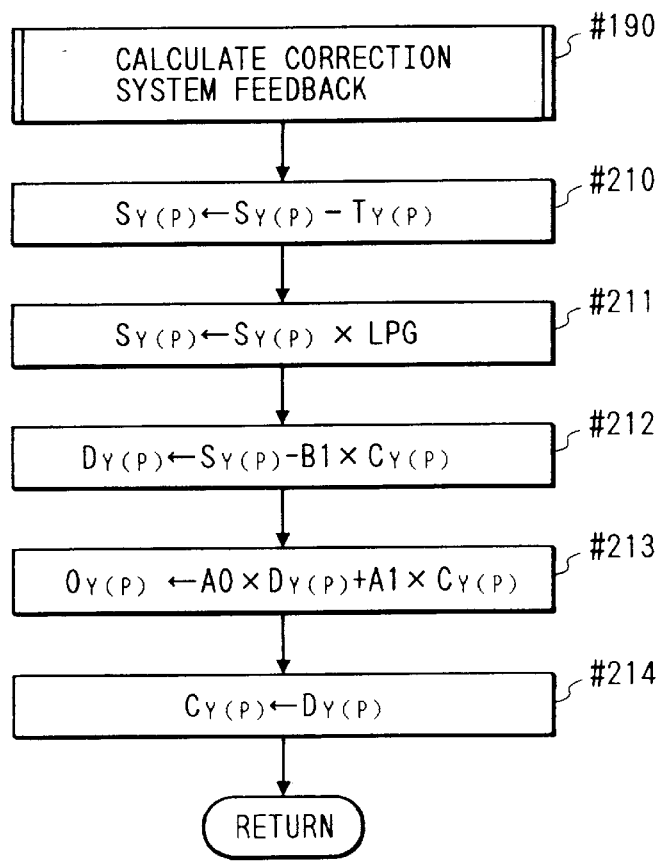
FIG. 10 is a flow chart showing the operation of the camera system according to the first embodiment of the present invention.

186. In step #187, the output from the sensor unit (position detector) 15 (constituted by the IRED, PSD, and processing circuit) which detects the movement, in the yaw direction, of the correction optical system 9 shown in FIG. 1 begins to be converted into digital data by the A/D converter 18. It is checked in step #188 if the A/D conversion operation is finished. If Y in step #188, the A/D conversion result is transferred to a register $T_Y$ in the CPU 11 in step #189. In step #190, a feedback calculation of the yaw correction system is executed, so that the contents of the register $S_Y$, which stores data corresponding to the sensor output, coincide with the contents of the register $T_Y$, which stores data corresponding to the position output of the correction system. This method will be described below with reference to the flow chart in FIG. 10. In FIG. 10, in step #210, the difference between the above-mentioned register $S_Y$ (register $S_P$ in the case of the pitch direction) and register $T_Y$ (register $T_P$ in the case of the pitch direction) is set in the register $S_Y$ (or $S_P$). In step #211, the contents of the register $S_Y$ (or $S_P$) are multiplied with predetermined data LPG for determining the loop gain of feedback control of this correction optical system, and the product is set in the register $S_Y$ (or $S_P$) again. Steps #212 to #214 correspond to a flow for executing a phase compensation calculation (in this case, a first-order phase advance compensation) of this correction optical system, and the values of coefficients B1, A0, and A1 used in this flow are set as predetermined data by known S-Z transform in advance. In step #212, the product of the predetermined coefficient data B1 and the contents of the calculation register $C_Y$ (or $C_P$; these registers store values determined in previous sampling) is subtracted from the contents of the register $S_Y$ (or $S_P$), and the difference is set in a register $D_Y$ (or $D_P$). In step #213, as a product sum calculation, the product of the predetermined coefficient data A0 and the contents of the register $D_Y$ (or $D_P$) is added to the product of the predetermined coefficient data A1 and the contents of the register $C_Y$ or ($C_P$), and the sum is set in a register $O_Y$ (or $O_P$). Finally, in step #214, the value of the register $D_Y$ (or $D_P$) is transferred to the register $C_Y$ (or $C_P$), thus ending the feedback calculation of the correction optical system. Referring back to FIG. 9, in step #191, the value of the register $O_Y$ as the result of the feedback calculation of the yaw correction system is transferred as DADATA to the D/A converter 12 in FIG. 1, and a current corresponding to this output value is supplied to the correction optical system 9 via the drive circuit 13, thus executing a drive operation, in the yaw direction, of the correction optical system 9 on the basis of the sensor output in the yaw direction. Upon completion of this control operation, the flow jumps to step #200 and the interruption operation ends. On the other hand, if it is determined in step #185 that the received command is not a reception command of yaw sensor data, the flow advances to step #192 to check, in turn, if the received command is a reception command of pitch sensor data. If Y in step #192, steps #193 to #198 are executed to perform drive control, in the pitch direction, of the correction optical system 9. Since this control method is the same as that in steps #186 to #191 in the yaw direction, a detailed description thereof will be omitted. Furthermore, if it is determined in step #192 that the received command is not a reception command of pitch sensor data, either, control according to a normal lens communication, e.g., drive control of the focusing lens on the basis of a signal for focusing control, which signal is transmitted to the exchangeable lens 8 via the serial bus line in step #105 in FIG. 4A in the operation of the CPU 2 in the camera, or aperture state control of an aperture mechanism (not shown) on the basis of a signal corresponding to photometry data transmitted to the exchangeable lens 8 via the serial bus line 7 in step #123 in FIG. 4B, is executed in step #199. Upon completion of this control, the serial communication interruption flag is cleared in step #200, thus ending all the serial interruption processing operations.

As described above, in this embodiment, information signals from the yaw and pitch sensors in the camera side are alternately transmitted to the lens side at predetermined time intervals, and the lens side executes control of the correction optical system each time it receives this data.

(Second Embodiment)

The second embodiment of the present invention will be described below with reference to the flow charts shown in FIGS. 11 to 14. Since the hardware arrangement of the entire system is the same as that shown in FIGS. 1 to 3 in the first embodiment, and the main processing of the camera CPU 2 is the same as that shown in FIG. 4 in the first embodiment, a detailed description thereof will be omitted. FIG. 11 is a flow chart for explaining timer interruption processing in which an interruption is generated each predetermined time interval T. In step #250, the output from the vibration sensor 5 in the yaw direction shown in FIG. 1 begins to be converted into digital data by the A/D converter 3. In step #251, it is checked if the A/D conversion operation is finished. If completion of A/D conversion is detected, a predetermined calculation is performed for the conversion result in step #252. Since this data conversion calculation is the same as that in FIG. 6 in the first embodiment, a detailed description thereof will be omitted. In step #253, the value of a register C in the CPU 2, which register stores this calculation result, is compared with the value of the internal register $U_Y$ (which is reset to "OH" in an initialization operation, and stores the contents of the register C, which was determined in the immediately preceding sampling). If it is determined that the two values coincide with each other, the flow jumps to step #258 to start control for detecting the sensor output in the pitch direction. On the other hand, if it is determined in step #253 that the two values do not coincide with each other, the contents of the register C are set in the register $U_Y$ for the next timer interruption processing operation in step #254, and the contents of the register C are transferred to a transmission data register in step #255. In step #256, the contents are transmitted to the lens side in accordance with the timing chart shown in FIG. 7. It is checked in step #257 if transmission of a predetermined number of bytes is completed. If Y in step #257, the flow advances to step #258 to start the conversion and transfer operation of sensor data in the pitch direction. Since the operations in steps #258 to #265 are the same as those in steps #250 to #257, a detailed description thereof will be omitted. Finally, a timer interruption flag is cleared in step #266, thus ending the interruption operation.

Figure 12:
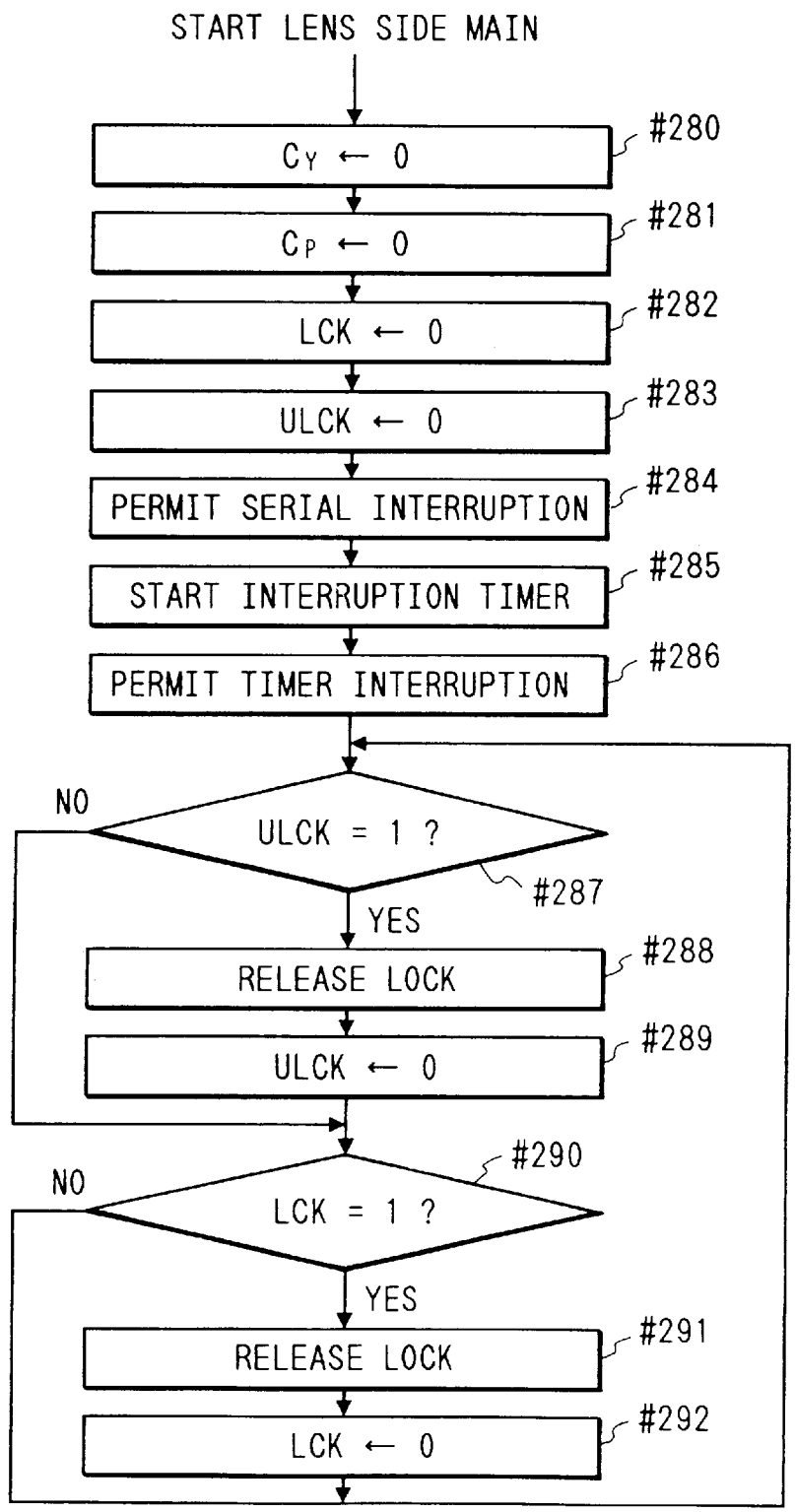
FIG. 12 is a flow chart showing the operation of the camera system according to the second embodiment of the present invention.

The control method at the lens side will be explained below. FIG. 12 is a flow chart for explaining main processing of the CPU 11 at the lens side. This operation is substantially the same as that shown in FIG. 8 in the first embodiment, except for some steps, i.e., except that steps #285 and #286 are added. In these different steps, a timer for generating an interruption at a predetermined time interval T is arranged at the lens side. More specifically, the timer is started in step #285, and the interruption is permitted in step #286. Therefore, the main processing of the lens CPU 11 waits for reception of sensor data transmitted from the camera side and a timer interruption for controlling the correction optical system at predetermined time intervals.

Figure 13:
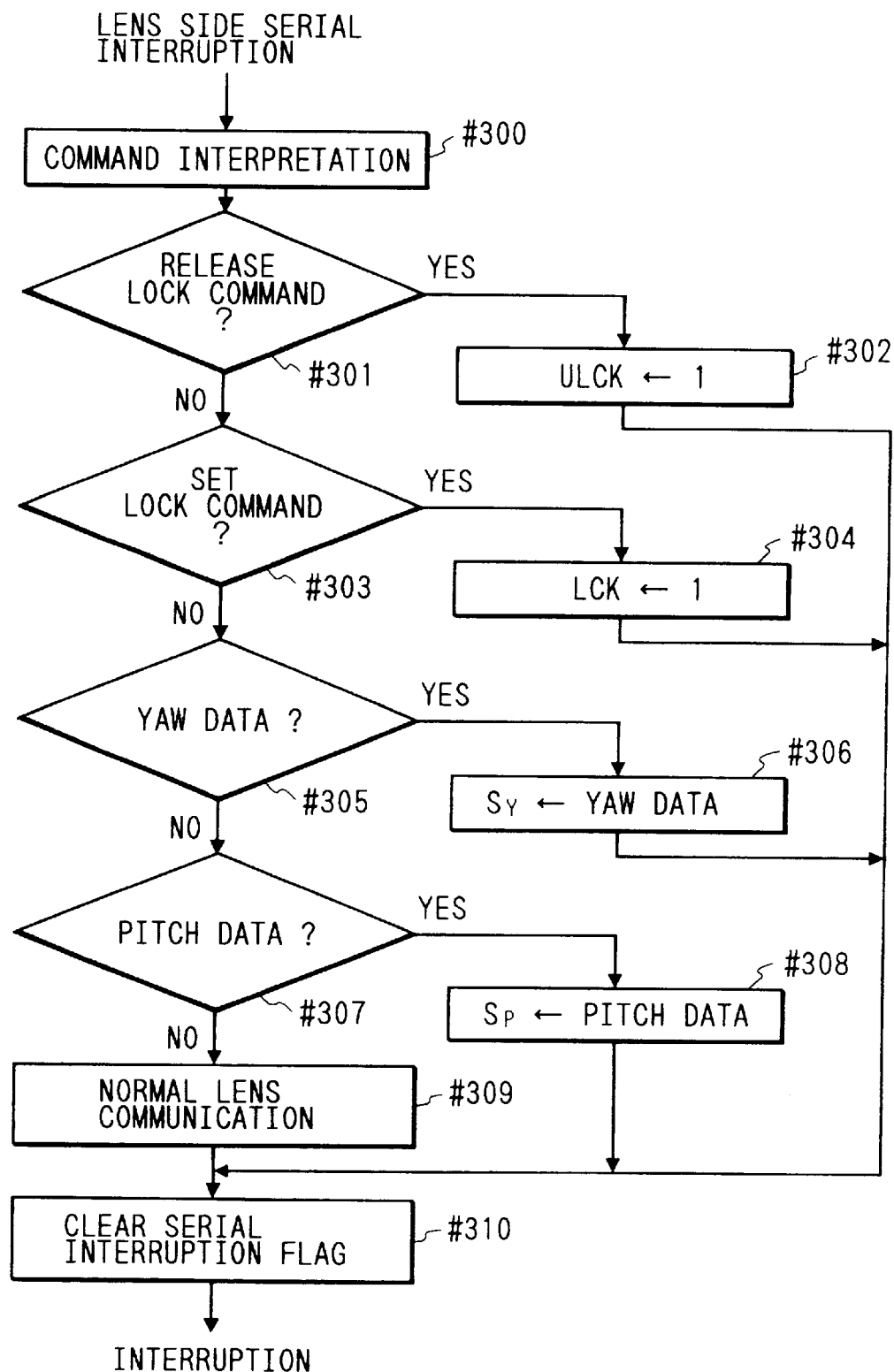
FIG. 13 is a flow chart showing the operation of the camera system according to the second embodiment of the present invention.

The serial interface interruption processing method at the lens side will be described below with reference to FIG. 13.

In step #300, the communication contents of a command sent from the camera side are checked. If it is determined in step #301 that the communication contents correspond to a lock release command, the flag ULCK for urging a lock release operation in the main processing in the CPU is set to be "1" in step #302, and thereafter, the flow jumps to step #310 to clear a flag for a serial interruption operation, thus ending the interruption operation. On the other hand, if it is determined in step #301 that the communication contents do not correspond to a lock release command, it is checked in turn in step #303 if the communication contents correspond to a lock set command. If Y in step #303, the flag LCK for urging a lock set operation in the main processing in the CPU is set to be "1" in step #304, and the interruption operation ends via step #310. If it is determined in step #303 that the communication contents do not correspond to a lock set command, it is checked in step #305 if the communication contents correspond to received data from the yaw sensor. If Y in step #305, the contents of the yaw sensor are set in the register $S_Y$ in the CPU. In this case as well, the interruption operation immediately ends via step #310. On the other hand, if it is determined in step #305 that the communication contents do not correspond to the received data from the yaw sensor, it is checked in step #307 if the communication contents correspond to received data from the pitch sensor. If Y in step #307, the contents of the pitch sensor data are set in the register $S_P$ in step #308, and the interruption operation ends via step #310. If it is determined in step #307 that the communication contents do not correspond to the received data from the pitch sensor, either, it is determined that a normal lens communication is performed, and normal lens communication processing is executed in step #309. In step #310, a serial communication interruption flag is cleared, thus ending the interruption operation.

The timer interruption processing method at the lens side in which an interruption is generated each predetermined time interval T will be explained below with reference to. In step #320, the output from the sensor unit for detecting the movement, in the yaw direction, of the correction optical system 9 shown in FIG. 1 begins to be converted into digital data by the A/D converter 18. In step #321, it is checked if the conversion operation is finished. If Y in step #321, the conversion result is set in the register $T_Y$ in the CPU in step #322. In step #323, as shown in FIG. 10 in the first embodiment, a feedback calculation for operating the correction optical system 9 to follow the output from the yaw sensor is executed using the register $S_Y$ which stores a value corresponding to the data output from the yaw sensor, and also using the register $T_Y$. Furthermore, the contents of the register $O_Y$ corresponding to this calculation result are transferred as DADATA to the D/A converter 12 in step #324, and as a result, the correction optical system is driven via the drive circuit 13.

As described above, in this embodiment, only when the sensor value detected at the camera side changes, data is transmitted to the lens side.

(Third Embodiment)

Figure 14:
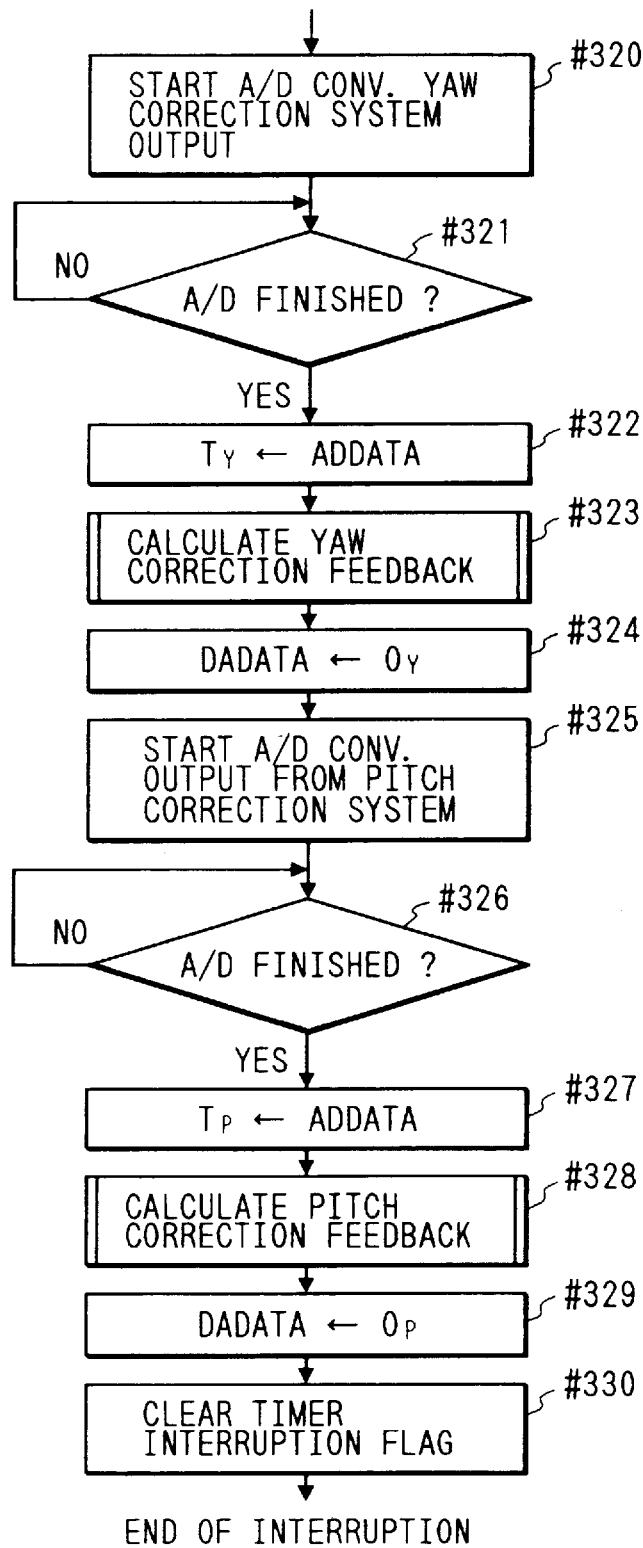
FIG. 14 is a flow chart showing the operation of the camera system according to the second embodiment of the present invention.
Figure 15:
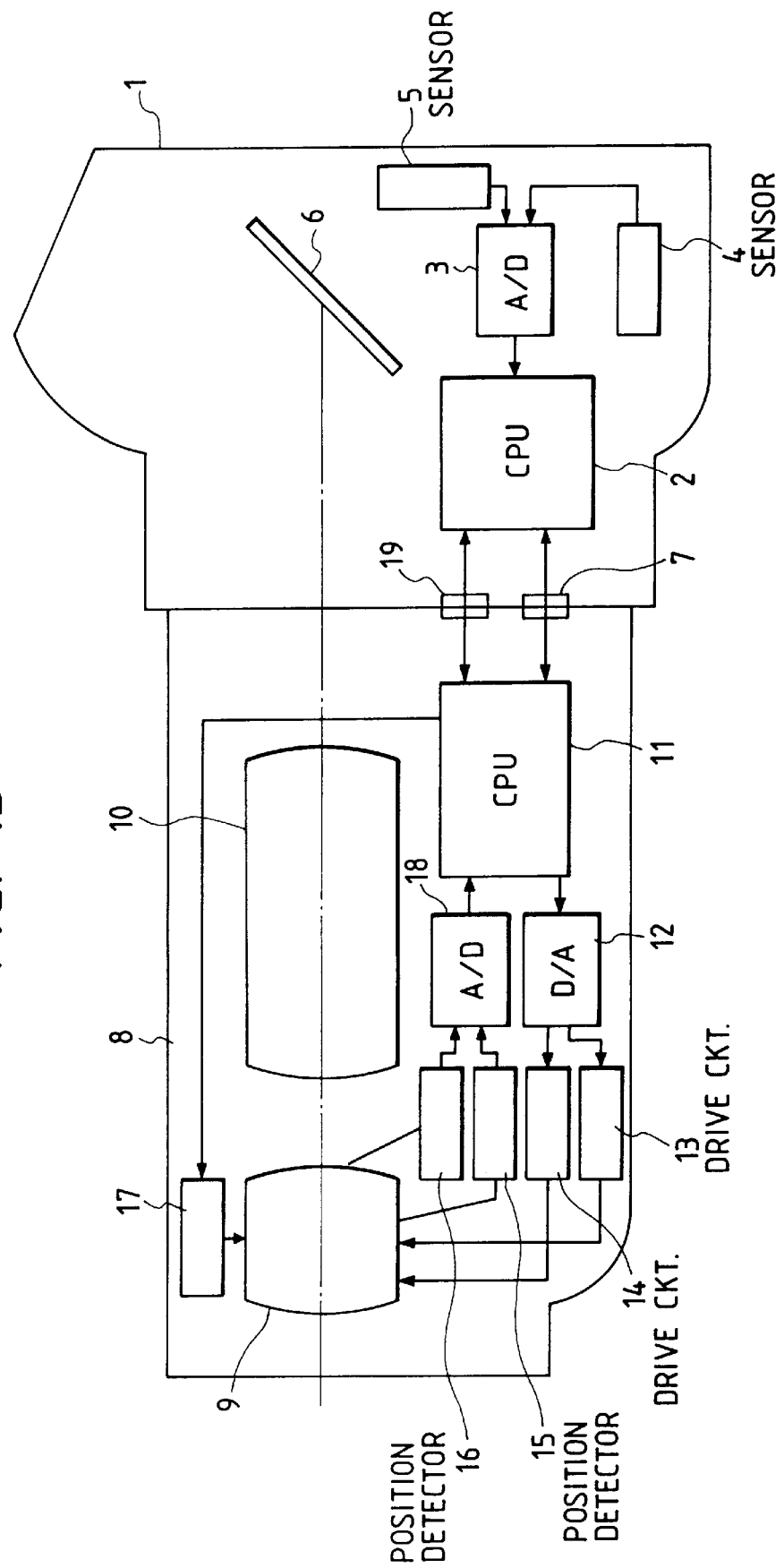
FIG. 15 is a sectional view showing the arrangement of a camera system according to the third embodiment of the present invention.

FIG. 15 is a sectional view showing the arrangement according to the third embodiment of the present invention. The basic arrangement of this embodiment is the same as that in FIG. 1 in the first embodiment. The outputs from the sensors 4 and 5 for detecting vibrations, in the yaw and pitch directions, of the entire camera are converted into digital data by the A/D converter 3, and the digital data are fetched in the CPU 2. The data in the CPU 2 are transferred to the CPU 11 via a special-purpose serial bus line 19 different from the serial bus line 7, which is used in normal communications between the camera main body 1 and the exchangeable lens 8. On the other hand, in the exchangeable lens 8, the outputs from the position detectors 15 and 16 for detecting the absolute position of the correction optical system 9 itself are converted into digital data by the A/D converter 18, and the digital data are fetched in the CPU 11. Furthermore, the CPU 11 compares the sensor data from the camera main body with the position data of the correction optical system 9, and transfers the comparison result to the D/A converter 12. Therefore, finally, the output result from the D/A converter 12 is input to the drive circuits 13 and 14, and the correction optical system 9 is driven by electric power supplied from these drive circuits. Note that the camera side processing and the lens side processing are basically the same as those shown in the flow charts in FIGS. 4A to 10 in the first embodiment and the flow charts in FIGS. 11 to 14 in the second embodiment. When the lens serial interruption processing in FIGS. 9A and 9B are replaced by interruption processing of the special-purpose serial interface (bus line) 19, the normal lens communication processing in step #199 is omitted. Similarly, when the processing in FIG. 13 is replaced by interruption processing of the special-purpose serial interface (bus line) 19, the normal lens communication processing in step #309 is omitted. As described above, in this embodiment, data output from the vibration sensors in the camera main body are transferred to the lens side via the serial bus line different from that used in a normal communication between the camera and the lens.

(Fourth Embodiment)

Figure 16:
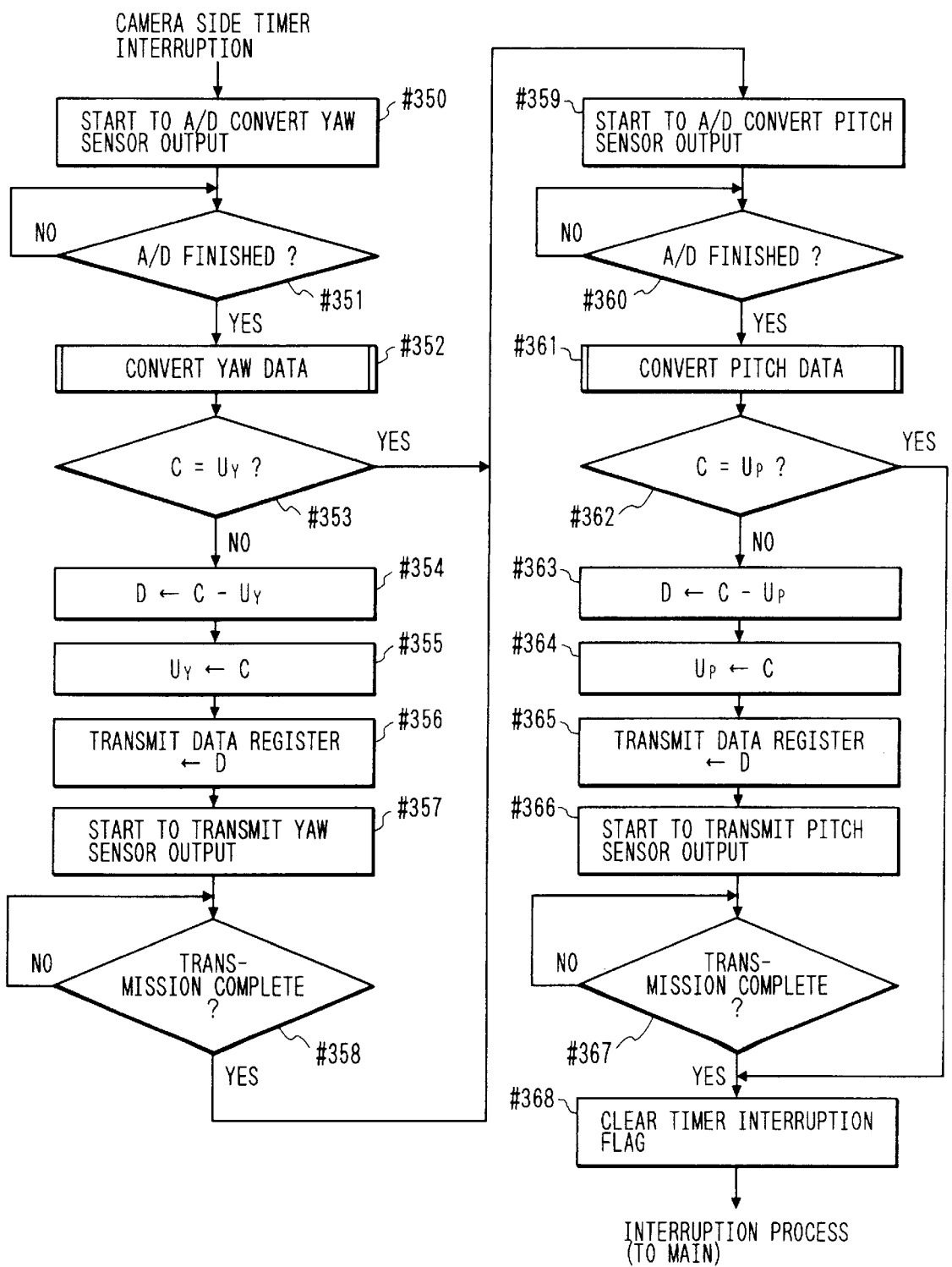
FIG. 16 is a flow chart showing the operation of a camera system according to the fourth embodiment of the present invention.
Figure 17:
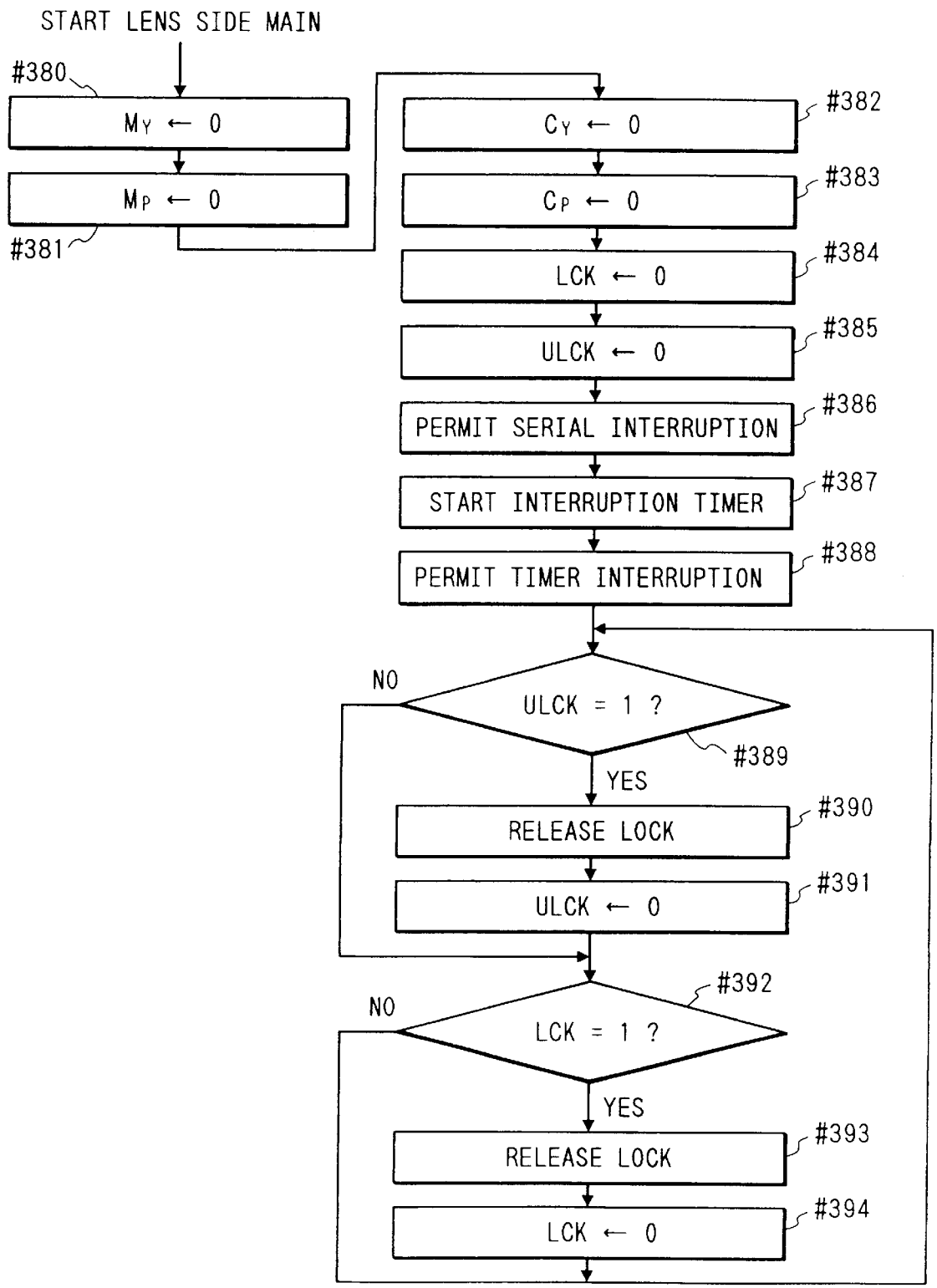
FIG. 17 is a flow chart showing the operation of the camera system according to the fourth embodiment of the present invention.
Figure 18:
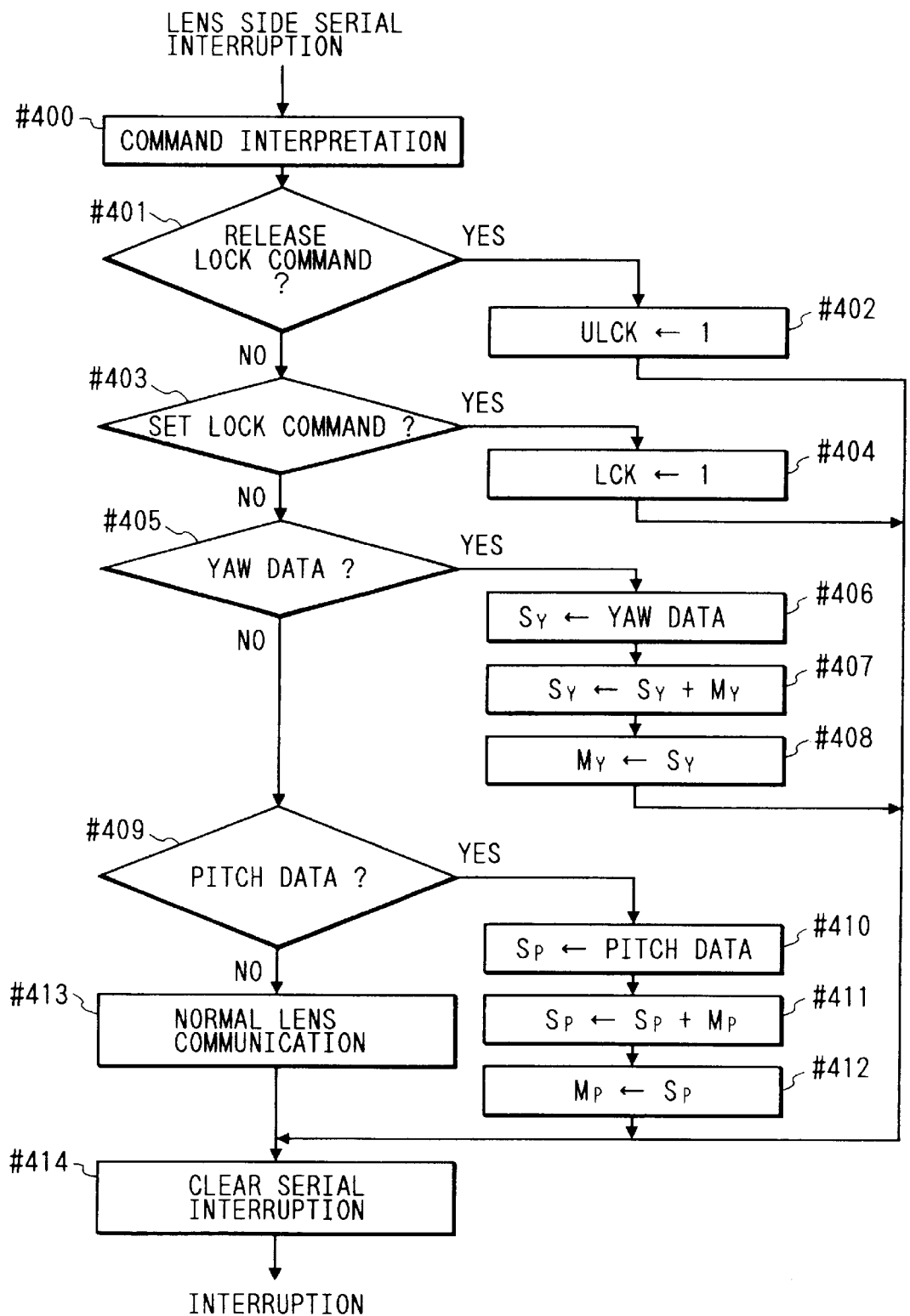
FIG. 18 is a flow chart showing the operation of the camera system according to the fourth embodiment of the present invention.

The operation according to the fourth embodiment of the present invention will be described below with reference to the flow charts in FIGS. 16 to 18. Since the basic hardware arrangement of this embodiment is the same as that shown in FIG. 1 or 15, and the main processing of the camera CPU is the same as that shown in FIG. 5, a detailed description thereof will be omitted. Referring to FIG. 16, when a timer set in the main flow has measured a predetermined time T, a timer interruption is generated. In step #350, the output from the vibration sensor 5 in the yaw direction begins to be converted into digital data by the A/D converter 3. In step #351, it is checked if the A/D conversion operation is finished. If Y in step #351, a predetermined calculation is performed for the conversion result. In this case, since the calculation contents are the same as those shown in FIG. 6, a detailed description thereof will be omitted. Then, in step #353, the value of the register C in the CPU 2, which register stores the calculation result is compared with the value of the internal register $U_Y$ (which is reset to "OH" in an initialization operation, and stores the contents of the register C, which was determined in the immediately preceding sampling). If it is determined in step #353 that the two values coincide with each other, the flow advances to step #359 to start the A/D conversion operation, in turn, of the pitch sensor. On the other hand, if it is determined in step #353 that the two values do not coincide with each other, the difference obtained by subtracting the value of the register $U_Y$ from the value of the register C is set in a register D in step #354, and the value of the register C is transferred to the register $U_Y$ for the next timer interruption operation in step #355. Subsequently, the value of the register D is transferred to a transmission data register in the CPU 2 in step #356, and this value begins to be transferred to the lens CPU 11 via the serial bus line in step #357. In step #358, it is checked if transmission of a predetermined number of bytes is completed. If Y in step #358, the flow advances to step #359 to start the conversion and transfer operation, in turn, of pitch sensor data. Since steps #359 to #367 associated with the conversion and transfer operation of pitch sensor data are the same as steps #350 to #358 associated with the yaw direction, a detailed description thereof will be omitted. Finally, the timer interruption flag is cleared in step #368, thus ending the interruption operation.

The operation in the lens side main processing will be described below with reference to FIG. 17. In steps #380 and #381, internal registers $M_Y$ and $M_P$ used in lens side calculation processing are respectively reset to "0" in initialization processing. Thereafter, the flow advances to step #382. In this case, since steps #382 to #394 are the same as steps #280 to #292 in FIG. 12, a detailed description thereof will be omitted.

The serial interruption processing in which the lens side receives serial data from the camera side will be described below with reference to FIG. 18. Since a communication associated with mechanical lock control in steps #400 to #404 is the same as that in steps #300 to #304 in FIG. 13, a detailed description thereof will be omitted. In step #405, it is checked if the communication contents correspond to sensor data received from the yaw sensor. If Y in step #405, the data received from the yaw sensor is set in the register $S_Y$ in the CPU 11 in step #406. In step #407, the value of the register $S_Y$ is added to the value of the register $M_Y$, which value was set in advance in the previous interruption operation, and the sum is set in the register $S_Y$ again. Furthermore, in step #408, the value of the register $S_Y$ is transferred to the register $M_Y$ for the next interruption operation. Upon completion of the above operation, the flow jumps to step #414 to clear the serial interruption flag, thus ending the interruption operation.

On the other hand, if it is determined in step #405 that the communication contents do not correspond to the sensor data received from the yaw sensor, the flow advances to step #409 to check if the communication contents correspond to sensor data received from the pitch sensor. If Y in step #409, then the flow advances to step #410. In step #410, the contents of the data received from the pitch sensor are transferred to the register $S_P$. In step #411, the values of the registers $S_P$ and $M_P$ are added to each other, and the sum is set in the register $S_P$. In step #412, the value of the register $S_P$ is set in the register $M_P$. On the other hand, if it is determined in step #409 that the communication contents do not correspond to the sensor data received from the pitch sensor, normal lens communication processing is executed in step #413. In this case, as has been described in the third embodiment, if this communication is performed via the special-purpose interface 19, this operation is omitted, as a matter of course. Finally, the serial interruption flag is cleared in step #414, and this interruption operation ends.

On the other hand, actual correction optical system calculation control in the lens is performed in the timer interruption processing at the lens side shown in FIG. 14, and since this method is the same as that in FIG. 14, a detailed description thereof will be omitted. As described above, in this embodiment, sensor data in the camera are sent as relative data with respect to the previous data, and the lens side performs drive control of the correction optical system based on the relative data. Therefore, a stepping motor, and the like can be used in a drive operation of the correction optical system.

(Fifth Embodiment)

Figure 19:
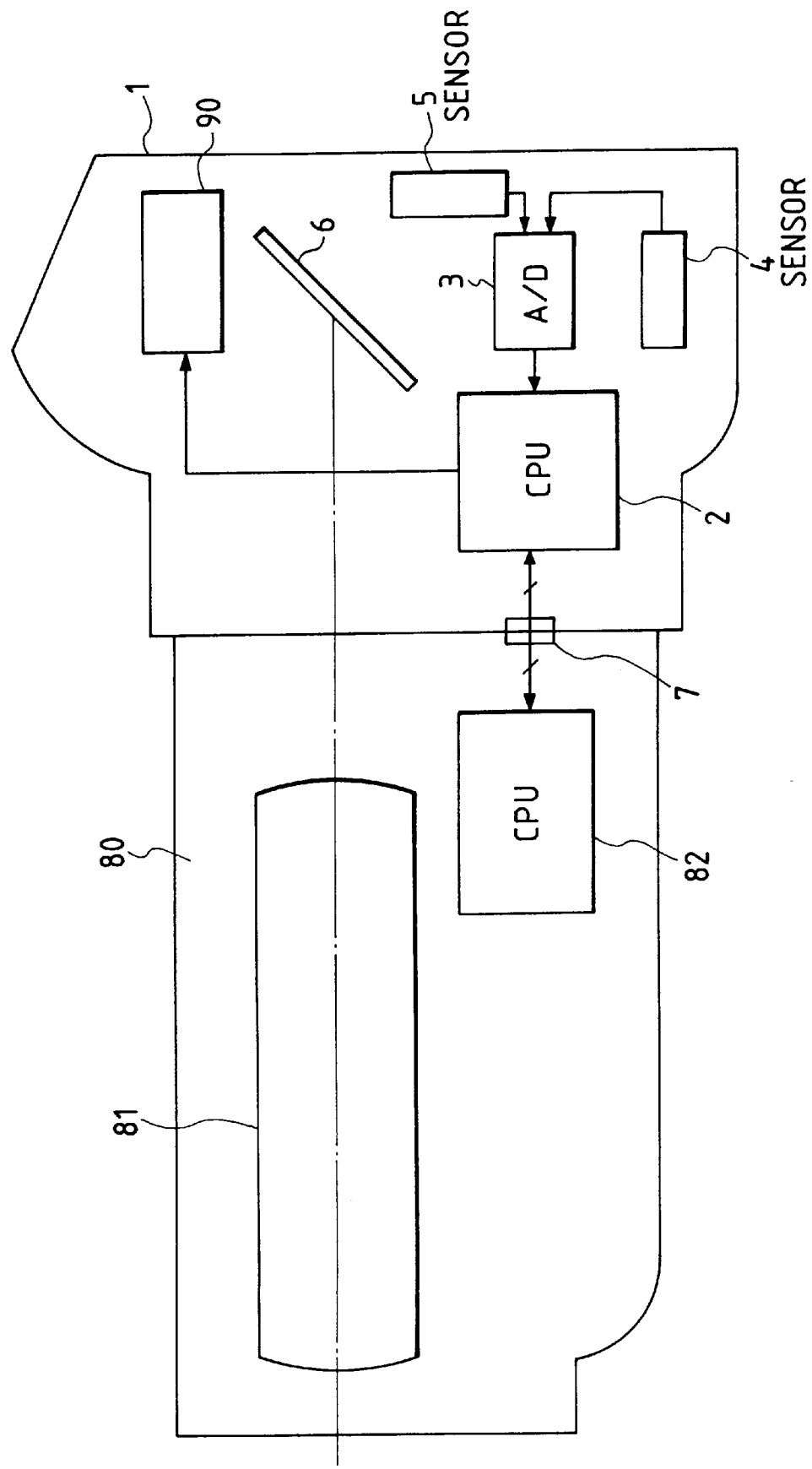
FIG. 19 is a sectional view showing the arrangement of the camera system according to the fifth embodiment of the present invention.

FIG. 19 shows the arrangement upon combination of a camera which incorporates sensors for detecting vibrations and a conventional type lens (which does not include any correction optical system) according to the fifth embodiment of the present invention. A camera main body 1 includes a CPU 2 for controlling the entire system, and sensors 4 and 5 for detecting vibrations in the yaw and pitch directions of the entire camera, which are arranged in the camera, as shown in FIG. 19. The sensor outputs are fetched to the CPU 2 as digital data via an A/D converter 3. Furthermore, the data fetched to the CPU 2 are transferred to a CPU 82 in an exchangeable lens 80 having a photographing optical system 81 via a serial interface 7 which connects the camera main body 1 and the exchangeable lens 80. The CPU 2 performs a predetermined display via a display 90 on the basis of information from the sensors, information from selection switches (not shown) on the camera main body, information from the lens, and the like.

Figure 20B:
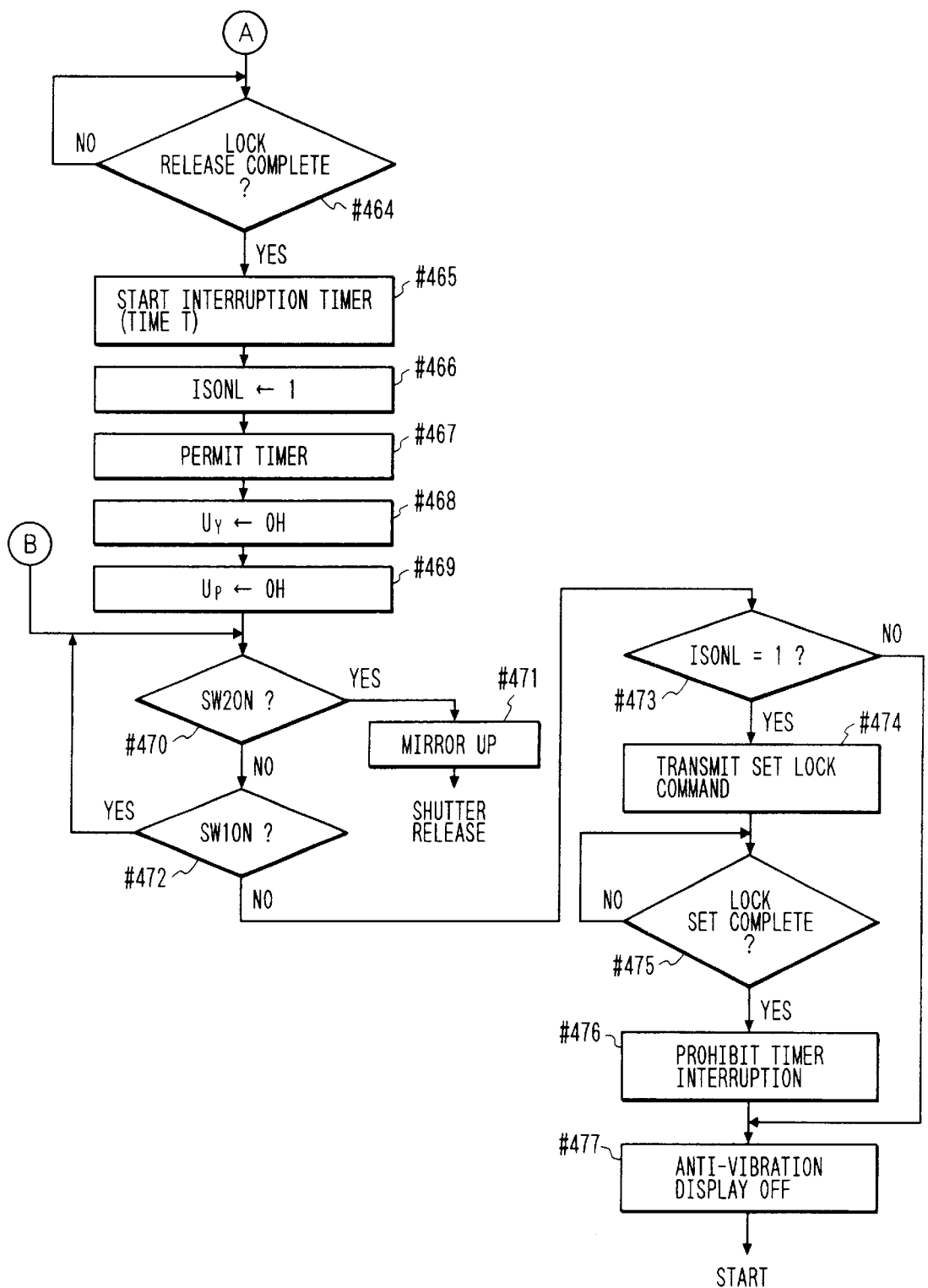
FIG. 20 is comprised of FIGS. 20A and 20B, which are flow charts showing the operation of the camera system according to the fifth embodiment of the present invention.

The operation processing of the CPU 2 in the camera main body will be described below with reference to the flow chart in FIG. 20. Referring to FIG. 20, since a general initialization operation of the camera in steps #450 to #456 is the same as that in steps #100 to #106 in FIGS. 4A and 4B, a detailed description thereof will be omitted. In step #457, it is checked if a vibration correction operation selection switch ISSW is ON. If N in step #457, the flow jumps to step #460; otherwise, the flow advances to step #458 to start an initial communication for requesting a lens ID code (identification code) from the camera main body to the lens side. The CPU stands by until the lens ID is sent. In step #459, it is checked if the received lens ID indicates an anti-vibration lens which incorporates the correction optical system described in the first embodiment, and the like. If NO in step #459, the flow advances to step #460, and a predetermined display of an anti-vibration OFF state is performed as in the case wherein it is determined in step #457 that the switch ISSW is OFF. In step #461, a latch ISONL in the CPU is reset to "0", and thereafter, the flow advances to step #470. Therefore, in this case, no sensor data is transferred from the camera main body to the lens side. On the other hand, if it is determined in step #459 that the lens ID indicates an anti-vibration lens, the flow advances to step #462 to perform a predetermined display of an anti-vibration ON state, and the flow advances to step #463. Since the predetermined operations in the anti-vibration ON state are performed in steps #463 to #476 and are the same as those in steps #109 to #122 in FIGS. 4A and 4B, a detailed description thereof will be omitted. In this case, if it is determined in step #472 that an SW1 is turned off, the above-mentioned anti-vibration display is turned off in step #477 via steps #473 to #476.

Figure 22A:
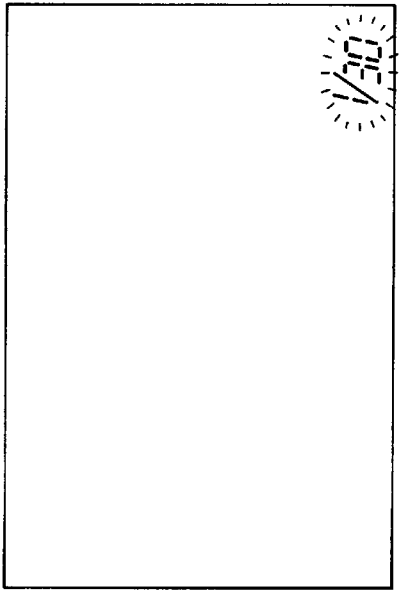
FIGS. 22A and 22B are views showing the display method of the camera system according to the fifth embodiment of the present invention.
Figure 22B:
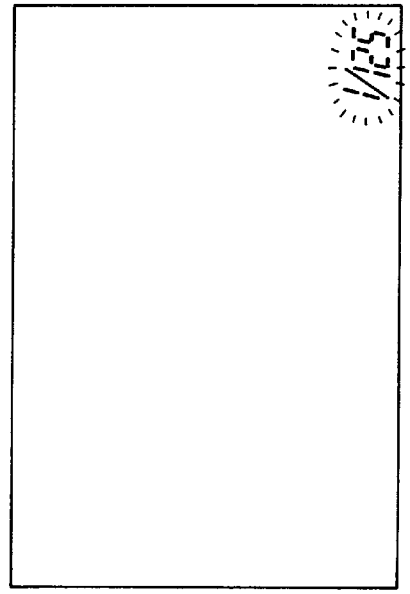
Figure 21A:
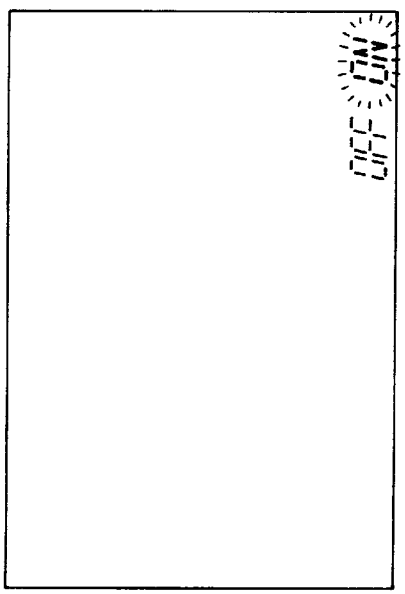
FIGS. 21A and 21B are views showing the display method of the camera system according to the fifth embodiment of the present invention.
Figure 21B:
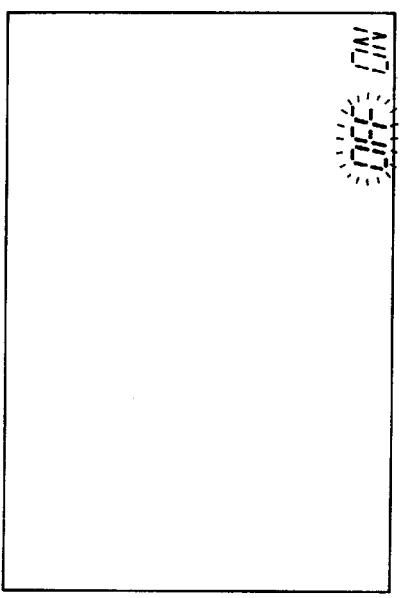
Figure 23:
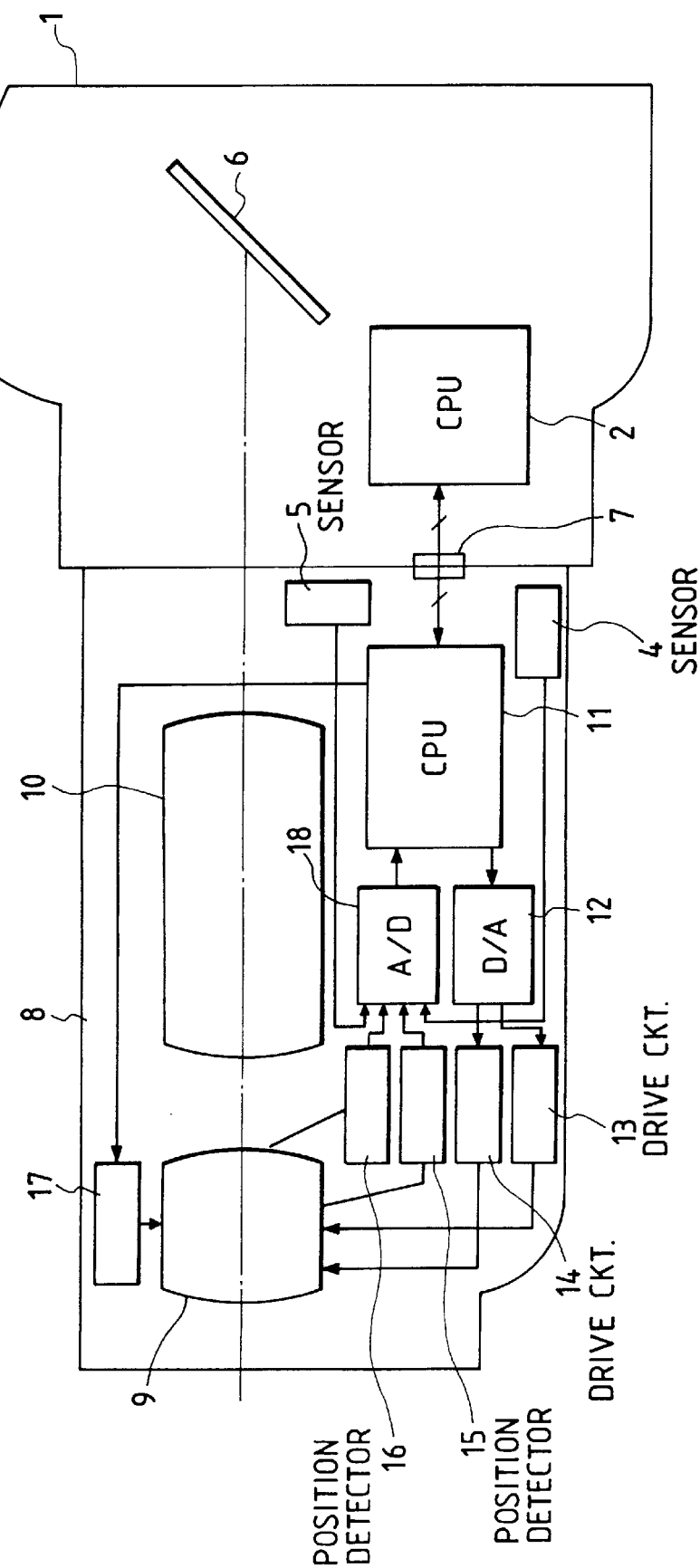
FIG. 23 is a sectional view showing the arrangement of a conventional image blur prevention apparatus.

FIGS. 21A to 22B show an example of the display described in this embodiment. In FIG. 21A, letters "ON" are displayed by LEDs or a liquid crystal display in a camera finder as the predetermined display of the anti-vibration ON state in step #462. In FIG. 21B, letters "OFF" are displayed in the camera finder as the predetermined display of the anti-vibration OFF state in step #460. On the other hand, in FIGS. 22A and 22B, a photographable shutter speed, or the like, which is calculated on the basis of the outputs from the vibration sensor, the focal length of the camera, the operation state of the anti-vibration apparatus, and the like are displayed in the camera finder. In FIG. 22A, a shutter speed limit "1/30 sec" is displayed as the predetermined display of the anti-vibration ON state in step #462, while under the same condition, a shutter speed "1/125 sec" is displayed as the predetermined display of the anti-vibration OFF state in step #460, as shown in FIG. 22B. In this manner, the displayed photographable shutter speed increases as compared to the anti-vibration ON state.

As described above, in this embodiment, control for a combination of a camera which incorporates vibration sensors and a normal lens which does not incorporate any correction optical system has been described.

The same applies to a combination of a normal camera which does not have any means associated with image blur prevention, and a lens having an image blur prevention means.

The present invention can also be applied to a case wherein upon formation of a system by attaching two devices, both of the two devices have means associated with image blur prevention, but have no compatibility therebetween, and an image blur prevention system cannot be formed.

In each of the above embodiments, a vibration gyro is used as the image blur detection means. However, other angular velocity sensors or other sensors (a displacement sensor, an angular displacement sensor, a velocity sensor, an acceleration sensor, an angular acceleration sensor, and the like, or an area sensor, and the like) may be used.

In each of the above embodiments, as the image blur prevention means, the image blur prevention function is achieved by moving an optical member in a plane substantially perpendicular to the optical axis. Alternatively, another image blur prevention means such as a variable apical angle prism may be used.

In each of the above embodiments, the present invention is applied to a silver chloride camera. However, the present invention can be similarly applied to other photographing devices such as a video camera, and other optical equipment.

The arrangements or the technical elements of the above embodiments may be combined as needed.

As described above, according to the embodiments of the present invention, a signal transfer operation between at least two devices which form an image blur prevention system when they are attached to each other can be realized by a simple arrangement.

When an image blur prevention system is not formed, a wasteful operation can be prevented.

The individual components shown in schematic or block form in the drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A signal transmission apparatus for use in an image blur prevention system, the image blur prevention system including a first apparatus and a second apparatus independent of the first apparatus and detachably connectable to the first apparatus, the first apparatus including an image blur detection device and a predetermined operation portion for performing a predetermined operation, and the second apparatus including an image blur prevention device for performing an image blur prevention operation in accordance with an output of the image blur detection device, the signal transmission apparatus comprising:

transmission means for performing a first transmission operation transmitting a signal in accordance with the output of the image blur detection device at every predetermined time period through one transmission line between the first apparatus and the second apparatus, and for performing a second transmission operation transmitting an operation start command signal for starting an image blur prevention operation of the image blur prevention device through said one transmission line;

determination means for determining when the predetermined operation portion performs a predetermined operation; and activation means for causing said transmission means to perform the second transmission operation a single time in response to a determination result of said determination means that the predetermined operation portion performs a predetermined operation, and thereafter causes said transmission means to continuously perform the first transmission operation during a time in which said determination means determines that the predetermined operation portion performs the predetermined operation.

2. An apparatus according to claim 1, wherein the image blur detection device detects image blur in a first direction and image blur in a second direction, and outputs a first blur signal and a second blur signal respectively corresponding to image blur in the first direction and image blur in the second direction, and the image blur prevention device prevents image blur in accordance with the first blur signal and the second blur signal output from the image blur detection portion.

3. An apparatus according to claim 2, wherein the image blur detection device comprises means for detecting a fluctuation of an optical apparatus for forming an image to be subjected to image blur prevention by the image blur prevention device.

4. An apparatus according to claim 2, wherein the image blur prevention device comprises means for optically displaying an image representing a state of an optical apparatus for preventing image blur.

5. An apparatus according to claim 4, wherein the image blur prevention device comprises means for preventing image blur by deflecting a light beam.

6. An apparatus according to claim 1, wherein said transmission means comprises means for transmitting a first transmission operation signal and a second transmission operation signal at different timings.

7. An apparatus according to claim 6, wherein said transmission means comprises means for alternately transmitting the first transmission operation signal and the second transmission operation signal.

8. An apparatus according to claim 1, wherein said transmission means comprises means for transmitting a first transmission operation signal and a second transmission operation signal only when the respective first transmission operation signal or second transmission operation signal changes.

9. An apparatus according to claim 1, wherein said transmission means comprises discrimination means for discriminating a relationship between the first apparatus and the second apparatus, and varying means for changing a transmission state of the transmission means in accordance with a discrimination result of said discrimination means.

10. An apparatus according to claim 9, wherein said discrimination means comprises means for discriminating if the first apparatus and the second apparatus are connected to form an image blur prevention system, and said varying means comprises means for regulating signal transmission when said discrimination means discriminates that an image blur prevention system is not formed.

11. An apparatus according to claim 10, wherein said transmission means comprises means for discriminating if the first apparatus and the second apparatus are connected to form an image blur prevention system, and instruction means for generating instruction information in accordance with a discrimination result of said discrimination means.

12. An apparatus according to claim 1, wherein said transmission means is arranged in at least one of the first apparatus and the second apparatus.

13. An apparatus according to claim 12, wherein said transmission means further comprises means for transmitting a signal for a function different than image blur prevention.

14. An apparatus according to claim 1, wherein the first apparatus is a camera, the second apparatus is an exchangeable lens detachably connectable to the camera, and said transmission means comprises means for transmitting a signal representing an exposure condition between the camera and the exchangeable lens.

15. An apparatus according to claim 1, wherein said transmission means includes a single transmission line for transmitting both the first blur signal and the second blur signal.

16. An apparatus according to claim 1, wherein said transmission means includes a timer and means for performing the first transmission operation at every period at which said timer measures a predetermined time.

17. An apparatus according to claim 16, wherein said activation means includes means for starting the predetermined time measurement by said timer in response to the determination result of said determination means that a predetermined operation of said predetermined operation portion is performed.

18. A signal transmission apparatus for use in an image blur prevention system, the image blur prevention system including a first apparatus and a second apparatus independent of the first apparatus and detachably connectable to the first apparatus, the first apparatus including an image blur detection device for detecting image blur in first and second directions, and the second apparatus including an image blur prevention device for performing an image blur prevention operation in at least two directions in response to an output of the image blur detection device, the signal transmission apparatus comprising:

conversion means for converting an analog signal corresponding to image blur detected by the image blur detection device to a digitized blur signal;

a signal output circuit which outputs a digitized first blur signal corresponding to image blur in the first direction detected by the image blur detection device and a digitized second blur signal corresponding to image blur in the second direction detected by the image blur detection device; and transmission control means for transmitting, from said first apparatus to said second apparatus, in time series format using a common transmission line, the digitized first blur signal and the digitized second blur signal provided by said signal output circuit, and respective first and second designation signals which indicate whether a signal being transmitted is a digitized first blur signal or a digitized second blur signal, where the signal transmission apparatus sequentially performs (1) a digital conversion operation of a first blur signal to a digitized first blur signal, (2) a transmission operation of a first designation signal indicating that a transmitted signal is a digitized first blur signal and a transmission operation of the digitized first blur signal, (3) a digital conversion operation of a second blur signal to a digitized second blur signal, and (4) a transmission operation of a second designation signal indicating that a transmitted signal is a digitized second blur signal and a transmission operation of the digitized second blur signal.

19. An apparatus according to claim 18, wherein said transmission control means comprises means for transmitting signals between the first apparatus and the second apparatus.

20. An apparatus according to claim 19, wherein the first apparatus is a camera and the second apparatus is an exchangeable lens detachably connectable to the camera.

21. An apparatus according to claim 19, wherein said transmission control means is arranged in at least one of the first apparatus and the second apparatus.

22. An apparatus according to claim 18, wherein said transmission control means comprises means for transmitting a signal from the image blur detection device to the image blur prevention device.

23. An apparatus according to claim 18, wherein said transmission control means comprises means for transmitting a control signal for controlling an image recording condition.

24. An apparatus according to claim 23, wherein said transmission control means comprises means for transmitting a control signal for at least one of focus control and aperture control.

25. An apparatus according to claim 18, wherein said transmission control means comprises means for transmitting the first blur signal and the second blur signal at different timings.

26. An apparatus according to claim 18, wherein said transmission control means includes a single transmission line for transmitting both the first blur signal and the second blur signal.

27. An apparatus according to claim 18, wherein said transmission control means comprises means for alternately transmitting the first blur signal and the second blur signal.

28. An apparatus according to claim 18, wherein said transmission control means comprises means for transmitting an image blur status signal indicative of a state of image blur.

29. A signal transmission apparatus for use in an image blur prevention system, the image blur prevention system including a first apparatus and a second apparatus independent of the first apparatus and detachably connectable to the first apparatus, the first apparatus including an image blur detection device for detecting image blur and for transmitting an output signal, and the second apparatus including an image blur prevention device for performing an image blur prevention operation in accordance with the output signal from the image blur detection device, the signal transmission apparatus comprising:

first transmission means for transmitting on a predetermined transmission line a command signal from the first apparatus to the second apparatus to control the operation of the image blur prevention device; and second transmission means for transmitting, in time series format with the command signal, on the predetermined transmission line, from the first apparatus to the second apparatus, a digitized image blur data signal which corresponds to the output signal of the image blur detection device, and a signal representing that a transmitted signal is the digitized image blur data signal.

30. An apparatus according to claim 29, wherein said first transmission means includes means for transmitting a command signal for starting an image blur prevention operation of the image blur prevention device.

31. An apparatus according to claim 30, wherein said first transmission means includes means for transmitting a command signal to perform a preparation operation preparatory to starting the image blur prevention operation of the image blur prevention device.

32. An apparatus according to claim 31, wherein said first transmission means includes means for transmitting a command signal for releasing a lock of locking means for fixing the image blur prevention operation of the image blur prevention device.

33. An apparatus according to claim 29, wherein said first transmission means includes means for transmitting a command signal for stopping an image blur prevention operation of the image blur prevention device.

34. An apparatus according to claim 33, wherein said first transmission means includes means for transmitting a command signal for performing a lock operation of locking means for fixing the image blur prevention operation of the image blur prevention device.

35. An apparatus according to claim 29, wherein said second transmission means includes means for transmitting, before transmitting the digitized image blur data signal, a signal representing that a subsequent signal to be transmitted is the digitized image blur data signal which corresponds to a blur of an image.

36. An apparatus according to claim 29, wherein said second transmission means includes means for transmitting a first blur signal which corresponds to a blur of an image in a first direction, and a second blur signal which corresponds to a blur of an image in a second direction.

37. An apparatus according to claim 36, wherein said second transmission means includes means for transmitting the first blur signal and the second blur signal in time series format.

38. An apparatus according to claim 37, wherein said second transmission means includes means for transmitting the first blur signal and the second blur signal alternately.

39. An apparatus according to claim 36, wherein said second transmission means includes means for transmitting, before transmitting a first blur signal, a signal representing that a subsequent signal to be transmitted is a first blur signal, and for transmitting, before transmitting a second blur signal, a signal representing that a subsequent signal to be transmitted is a second blur signal.

40. An apparatus according to claim 29, wherein said second transmission means includes a signal output circuit for outputting a detection signal of the image blur detection device as a digital signal, and means for transmitting the output signal of said signal output circuit.

41. An apparatus according to claim 40, wherein said second transmission means includes a conversion circuit for converting the output signal of the image blur detection device to the digital signal, and means for transmitting an output signal of said conversion circuit.

42. An apparatus according to claim 29, wherein said first apparatus is an optical apparatus.

43. An apparatus according to claim 42, wherein said first apparatus is a camera.

44. An apparatus according to claim 43, wherein said second apparatus is a lens apparatus used with said camera.

45. An apparatus according to claim 29, wherein said second apparatus is an optical apparatus.

* * * * *

UNITED STATES PATENT AND TRADEMARK OFFICE
CERTIFICATE OF CORRECTION

PATENT NO. : 6,088,533
DATED : July 11, 2000
INVENTOR(S) : YASUHIKO SHIOMI

It is certified that error appears in the above-identified patent and that said Letters Patent is hereby corrected as shown below:

At [57] ABSTRACT

Line 5, "arrangements, a" should read --arrangements. The--.

Column 5

Line 33, "a series of operation end." should read --the series of operations ends.--.

Column 9

Line 37, "to." should read --to Fig. 14.--.

Signed and Sealed this

Seventeenth Day of April, 2001

Attest:

NICHOLAS P. GODICI

*Attesting Officer*    *Acting Director of the United States Patent and Trademark Office*